US012718570B2

(12) United States Patent
Moteki et al.

(10) Patent No.: US 12,718,570 B2
(45) Date of Patent: Aug. 25, 2026

(54) STORAGE MEDIUM, INFORMATION PROCESSING METHOD, AND INFORMATION PROCESSING APPARATUS

(71) Applicant: FUJITSU LIMITED, Kawasaki (JP)

(72) Inventors: Atsunori Moteki, Inagi (JP); Yoshie Kimura, Kawasaki (JP); Junya Saito, Kawasaki (JP); Takuma Yamamoto, Yokohama (JP); Takahiro Saito, Asaka (JP); Katsuhisa Nakazato, Kawasaki (JP); Hideo Tanida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 17/959,461

(22) Filed: Oct. 4, 2022

(65) Prior Publication Data

US 2023/0206641 A1 Jun. 29, 2023

(30) Foreign Application Priority Data

Dec. 28, 2021 (JP) ................................ 2021-215274

(51) Int. Cl.
*G06V 20/52* (2022.01)
*G06V 10/82* (2022.01)
(Continued)

(52) U.S. Cl.
CPC .............. *G06V 20/52* (2022.01); *G06V 10/82* (2022.01); *G06V 40/176* (2022.01); *G06V 40/20* (2022.01); *G06V 2201/07* (2022.01)

(58) Field of Classification Search
CPC ...... G06V 20/52; G06V 10/82; G06V 40/176; G06V 40/20; G06V 2201/07
See application file for complete search history.

(56) References Cited

U.S. PATENT DOCUMENTS 8,219,438 B1 * 7/2012 Moon ................ G06Q 30/0204 705/7.29
9,589,448 B1 * 3/2017 Schneider ................. F41H 9/10
(Continued)

FOREIGN PATENT DOCUMENTS

CN 111476202 A 7/2020
JP 2020-71665 A 5/2020
(Continued)

OTHER PUBLICATIONS

Sun, Chen, et al. “Relational action forecasting.” Proceedings of the IEEE/CVF Conference on Computer Vision and Pattern Recognition. 2019 (Year: 2019).*
(Continued)

*Primary Examiner* — Oneal R Mistry
*Assistant Examiner* — Jongbong Nah
(74) *Attorney, Agent, or Firm* — Fujitsu Intellectual Property Center

(57) ABSTRACT

A non-transitory computer-readable storage medium storing an information processing program that causes at least one computer to execute a process, the process includes acquiring video data that has target objects that include a person and an object; specifying each relationship of each of the target objects in the acquired video data by using graph data that indicates a relationship of each of target object stored in a storage unit; specifying a behavior of the person in the acquired video data by using a feature of the person; and predicting a future behavior of the person or a state of the person by comparing the specified behavior of the person and the specified relationship with a behavior prediction rule, the behavior prediction rule being a rule associated with a future behavior of a person for each combination of a behavior of the person and a relationship.

15 Claims, 23 Drawing Sheets

(51) Int. Cl.
*G06V 40/16* (2022.01)
*G06V 40/20* (2022.01)

(56) References Cited

U.S. PATENT DOCUMENTS

| | | | | |
|---|---|---|---|---|
| 2015/0363644 | A1* | 12/2015 | Wnuk | G06V 40/23 382/103 |
| 2020/0057965 | A1* | 2/2020 | Howard | G06N 20/20 |
| 2020/0151585 | A1* | 5/2020 | Ishida | G06V 10/82 |
| 2020/0188736 | A1* | 6/2020 | Naito | A63B 24/0006 |
| 2021/0012216 | A1 | 1/2021 | Giovannini et al. | |
| 2021/0216821 | A1* | 7/2021 | Uchida | G06V 10/143 |

FOREIGN PATENT DOCUMENTS

| | | | |
|---|---|---|---|
| JP | 2020-77343 | A | 5/2020 |
| JP | 2021-111114 | A | 8/2021 |
| WO | 2019/049216 | A1 | 3/2019 |
| WO | 2021/046412 | A1 | 3/2021 |

OTHER PUBLICATIONS

Filntisis, Panagiotis Paraskevas, et al. "Fusing body posture with facial expressions for joint recognition of affect in child-robot interaction." IEEE Robotics and automation letters 4.4 (2019): 4011-4018. (Year: 2019).*

Fernández-Caballero, Antonio, José Carlos Castillo, and José María Rodríguez-Sánchez. "Human activity monitoring by local and global finite state machines." Expert Systems with Applications 39.8 (2012): 6982-6993. (Year: 2012).*

Chen Sun et al., "Relational Action Forecasting", 2019 IEEE/CVF Conference on Computer Vision and Pattern Recognition (CVPR), IEEE, XP033686364, pp. 273-283, Jun. 15, 2019 [retrieved on Jan. 8, 2020] Cited in Extended European Search Report (EESR) mailed on May 26, 2023 for corresponding European Patent Application No. 22196320.0.

Extended European Search Report (EESR) mailed on May 26, 2023 for corresponding European Patent Application No. 22196320.0.

JPOA—Japanese Office Action mailed Jun. 3, 2025 for Japanese Patent Application No. 2021-215274, with English translation (8 pages).

JPOA—Office Action of Japanese Patent Application No. 2021-215274 dated Dec. 2, 2025, with machine translation.

EPOA—Office Action of European Patent Application No. 22196320.0 dated Jun. 2, 2026 (8 pages). All references cited in EPOA were previously submitted in IDS filed on Jun. 16, 2023.

* cited by examiner 1
2
2
2
2
10
INFORMATION PROCESSING APPARATUS

FIG. 3

| | SEVERAL SECONDS TO SEVERAL MINUTES AHEAD | TO SEVERAL HOURS AHEAD | TO SEVERAL DAYS AHEAD | LONG TERM TO SEVERAL MONTHS AHEAD |
|---|---|---|---|---|
| USE CASE | ·HUMAN ASSISTANCE BY ROBOTS<br>·ONLINE COMMUNICATION ASSISTANCE | ·PURCHASING BEHAVIOR IN STORE<br>·SHOPLIFTING (CRIME)<br>·SUICIDE | ·POLICE BOX ATTACK<br>·DOMESTIC VIOLENCE | ·IMPROVEMENT IN PERFORMANCE<br>·ALZHEIMER'S (DISEASE PREDICTION) |

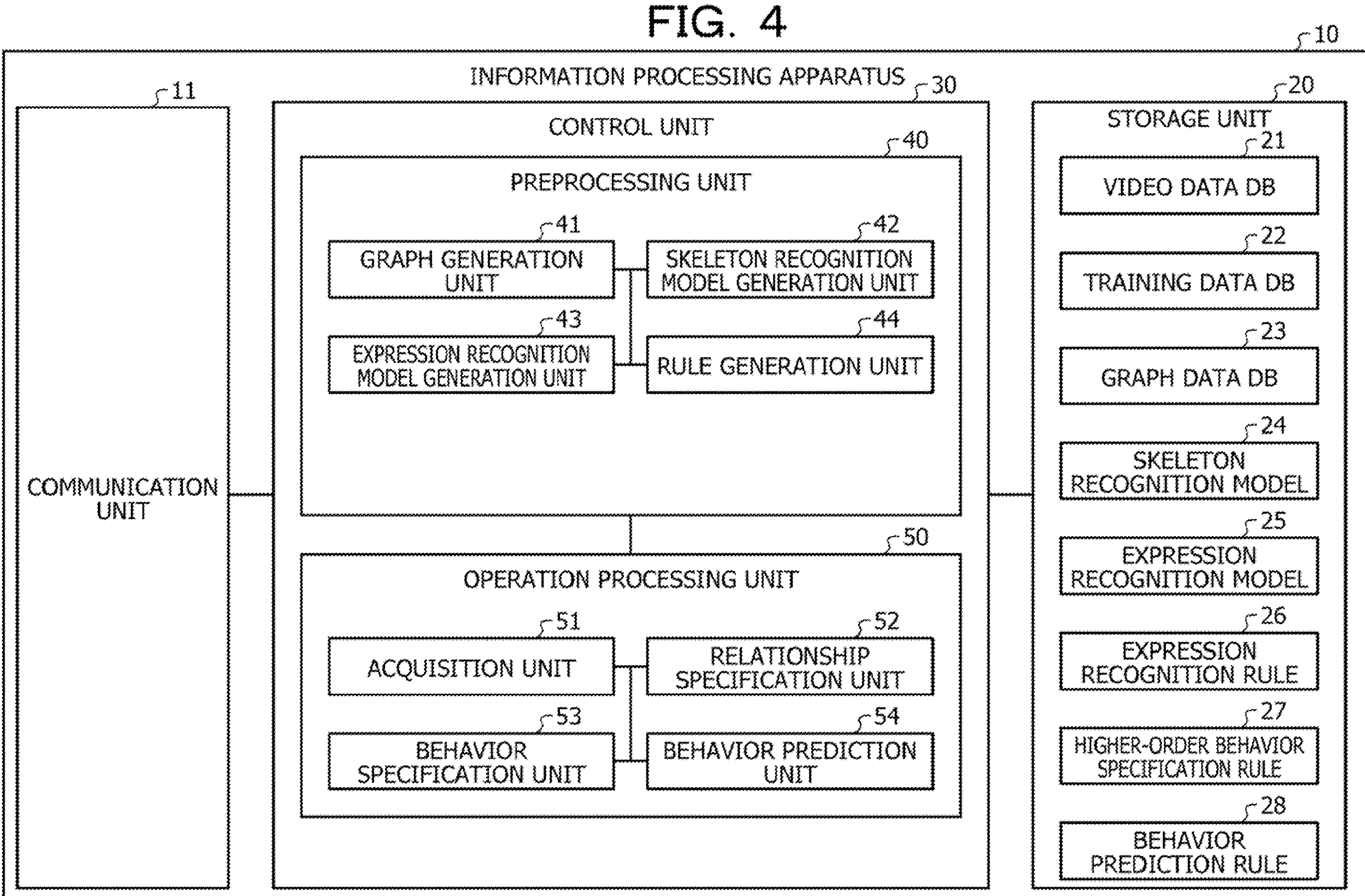
FIG. 4
10
INFORMATION PROCESSING APPARATUS
30
11
COMMUNICATION UNIT
CONTROL UNIT
40
PREPROCESSING UNIT
41
GRAPH GENERATION UNIT
42
SKELETON RECOGNITION MODEL GENERATION UNIT
43
EXPRESSION RECOGNITION MODEL GENERATION UNIT
44
RULE GENERATION UNIT
50
OPERATION PROCESSING UNIT
51
ACQUISITION UNIT
52
RELATIONSHIP SPECIFICATION UNIT
53
BEHAVIOR SPECIFICATION UNIT
54
BEHAVIOR PREDICTION UNIT
20
STORAGE UNIT
21
VIDEO DATA DB
22
TRAINING DATA DB
23
GRAPH DATA DB
24
SKELETON RECOGNITION MODEL
25
EXPRESSION RECOGNITION MODEL
26
EXPRESSION RECOGNITION RULE
27
HIGHER-ORDER BEHAVIOR SPECIFICATION RULE
28
BEHAVIOR PREDICTION RULE

FIG. 6

| EXPRESSION | ESTIMATION RESULT |
|---|---|
| SMILE | AU1:2、AU2:5、AU3:0、··· |
| ANGRY FACE | AU1:5、AU2:3、AU3:1、··· |
| ··· | ··· |

FIG. 8

| CURRENT BEHAVIOR / RELATIONSHIP | TAKING PRODUCT A IN HAND | BEING IN FRONT OF PRODUCT SHELF | LOOKING CAUTIOUSLY AROUND | ... | FOLLOWING | ... |
|---|---|---|---|---|---|---|
| HOLDING | PURCHASING PRODUCT A 10 MINUTES LATER | RETURNING PRODUCT A TO PRODUCT SHELF | SHOPLIFTING | ... | - | ... |
| PUTTING INTO BASKET | MOVING TO FOOD DEPARTMENT | ... | ... | ... | - | ... |
| ... | ... | ... | ... | ... | ... | ... |
| STALKING | - | - | - | ... | ATTACKING TARGET | ... |
| ... | ... | ... | ... | ... | ... | ... |

(-:NOT APPLICABLE (EXCEPTED))

FIG. 9

RECOGNITION MODEL

LABEL: PERSON (MAN)

RELATIONSHIP: HOLDING

LABEL: DRINK (GREEN)

MAN

PERSON

HOLDING

DRINK

GREEN

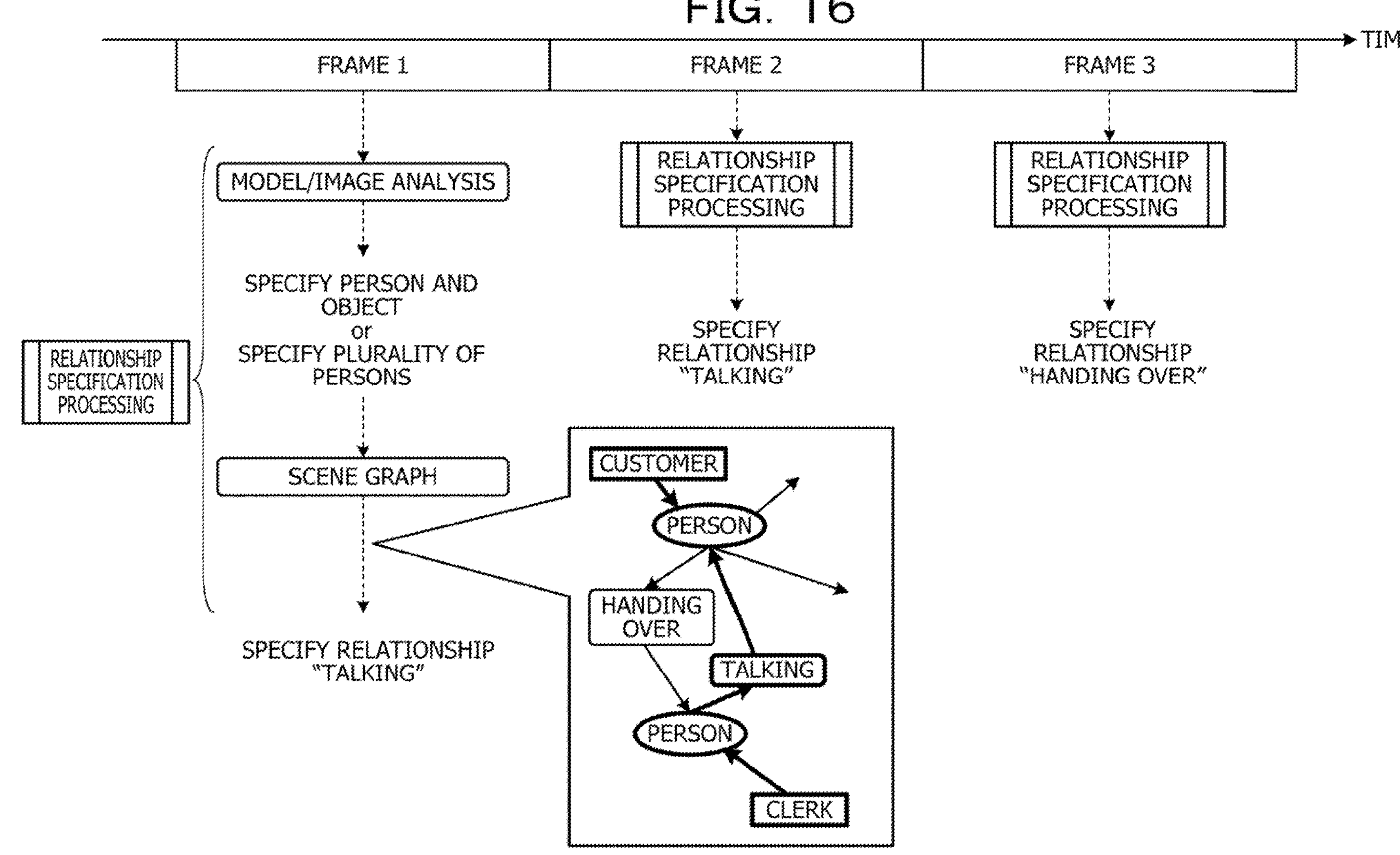
FIG. 16
TIME
FRAME 1
FRAME 2
FRAME 3
MODEL/IMAGE ANALYSIS
SPECIFY PERSON AND OBJECT
or
SPECIFY PLURALITY OF PERSONS
SCENE GRAPH
SPECIFY RELATIONSHIP "TALKING"
RELATIONSHIP SPECIFICATION PROCESSING
RELATIONSHIP SPECIFICATION PROCESSING
SPECIFY RELATIONSHIP "TALKING"
RELATIONSHIP SPECIFICATION PROCESSING
SPECIFY RELATIONSHIP "HANDING OVER"
CUSTOMER
PERSON
HANDING OVER
TALKING
PERSON
CLERK

FIG. 17

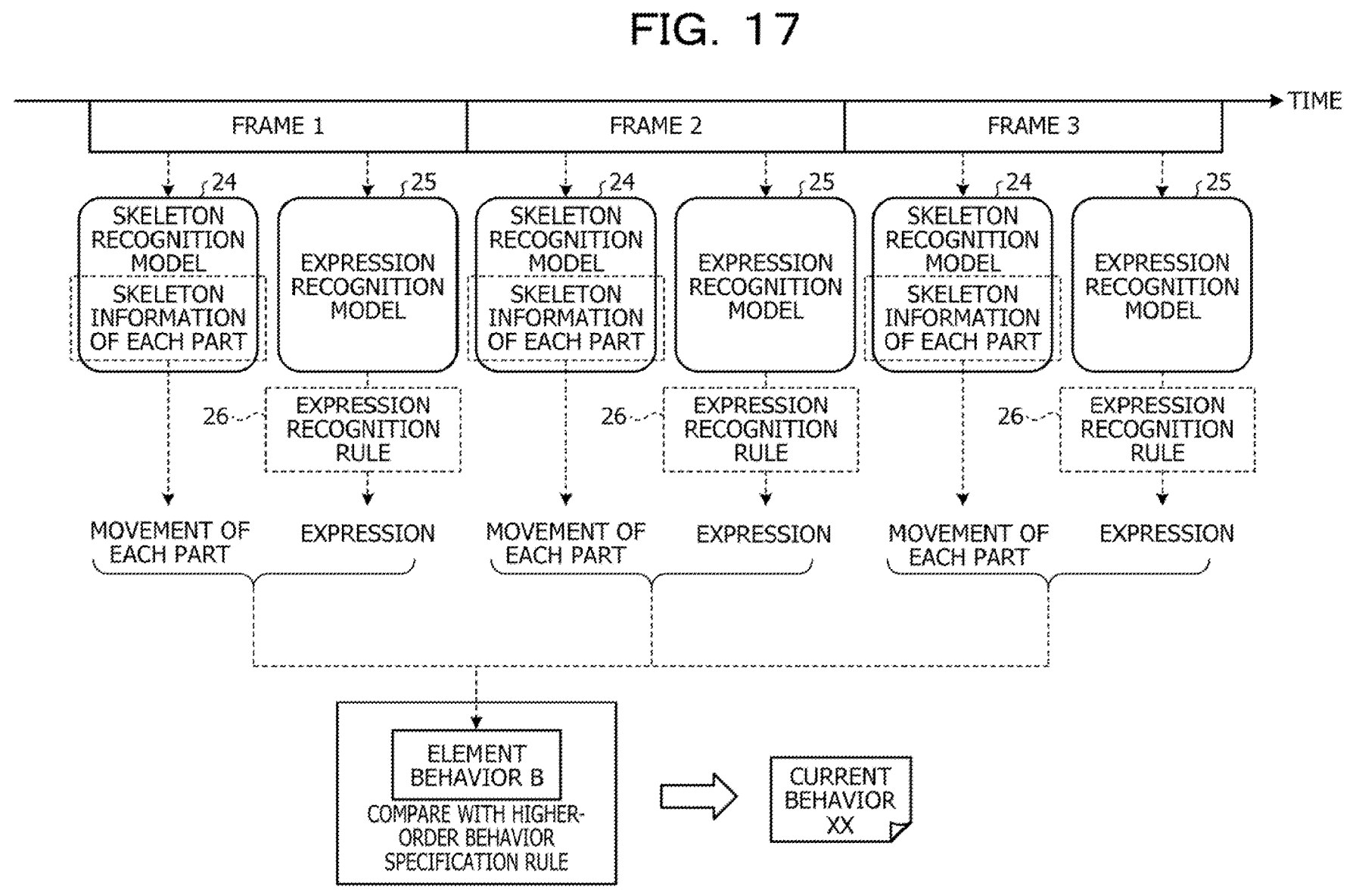

TIME

FRAME 1
FRAME 2
FRAME 3

24 SKELETON RECOGNITION MODEL
SKELETON INFORMATION OF EACH PART
25 EXPRESSION RECOGNITION MODEL
26 EXPRESSION RECOGNITION RULE
MOVEMENT OF EACH PART
EXPRESSION

24 SKELETON RECOGNITION MODEL
SKELETON INFORMATION OF EACH PART
25 EXPRESSION RECOGNITION MODEL
26 EXPRESSION RECOGNITION RULE
MOVEMENT OF EACH PART
EXPRESSION

24 SKELETON RECOGNITION MODEL
SKELETON INFORMATION OF EACH PART
25 EXPRESSION RECOGNITION MODEL
26 EXPRESSION RECOGNITION RULE
MOVEMENT OF EACH PART
EXPRESSION

ELEMENT BEHAVIOR B
COMPARE WITH HIGHER-ORDER BEHAVIOR SPECIFICATION RULE

CURRENT BEHAVIOR XX

FIG. 18

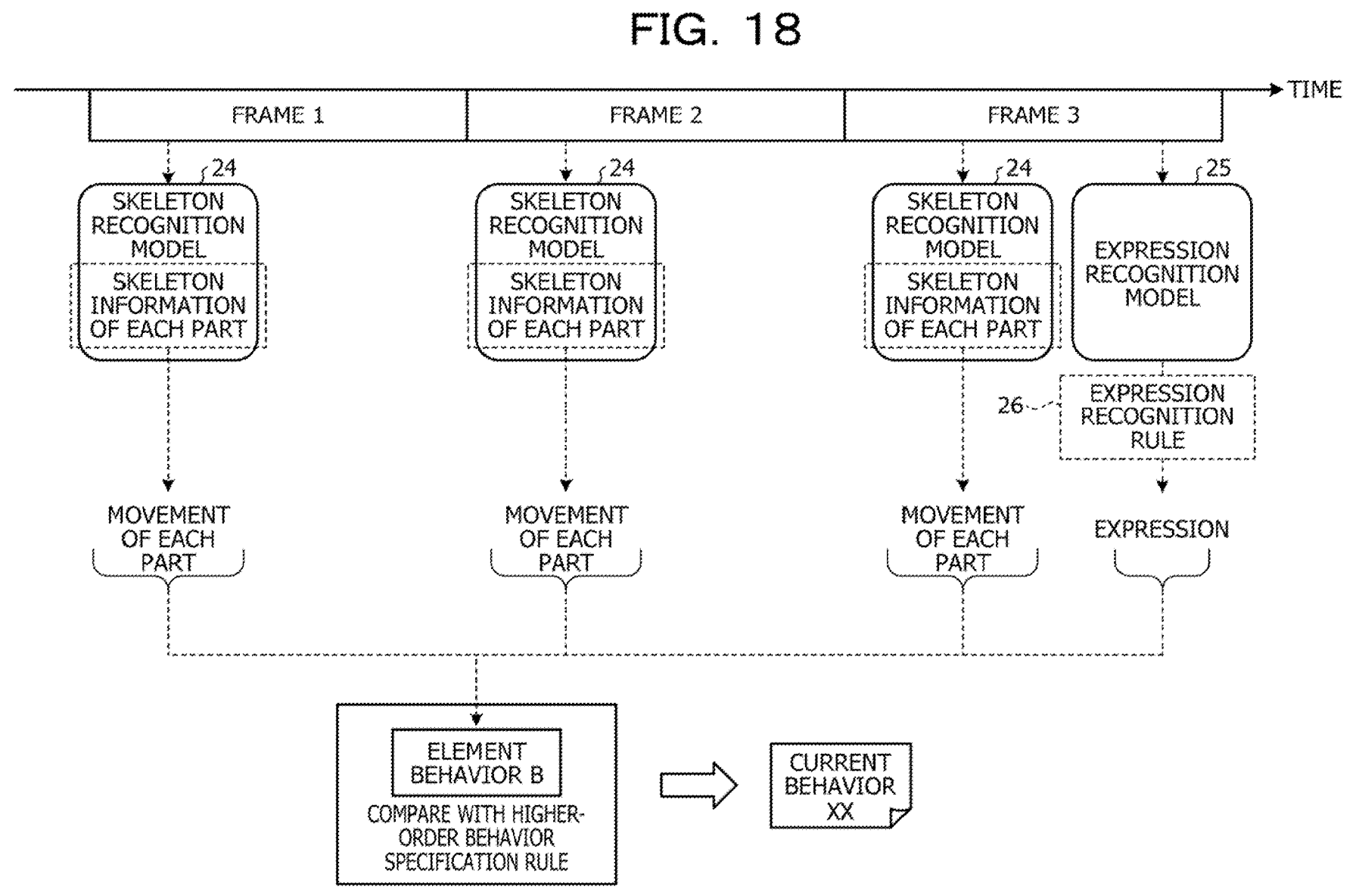

TIME

FRAME 1

FRAME 2

FRAME 3

24 SKELETON RECOGNITION MODEL

SKELETON INFORMATION OF EACH PART

MOVEMENT OF EACH PART

24 SKELETON RECOGNITION MODEL

SKELETON INFORMATION OF EACH PART

MOVEMENT OF EACH PART

24 SKELETON RECOGNITION MODEL

SKELETON INFORMATION OF EACH PART

MOVEMENT OF EACH PART

25 EXPRESSION RECOGNITION MODEL

26 EXPRESSION RECOGNITION RULE

EXPRESSION

ELEMENT BEHAVIOR B

COMPARE WITH HIGHER-ORDER BEHAVIOR SPECIFICATION RULE

CURRENT BEHAVIOR XX

PAST
CURRENT TIME
TIME
FRAME 1
FRAME 2
FRAME 3
FUTURE BEHAVIOR
RELATION SHIP "HOLDING"
RELATIONSHIP "HOLDING PRODUCT IN RIGHT HAND"
RELATION SHIP "HANDING OVER"
CURRENT BEHAVIOR XX
CURRENT BEHAVIOR AND RELATIONSHIP OF PERSON
COLLATE WITH BEHAVIOR PREDICTION RULE
PREDICTION

FIG. 22

STORAGE MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-215274, filed on Dec. 28, 2021, the entire contents of which are incorporated herein by reference.

FIELD

The embodiments discussed herein are related to a storage medium, an information processing method, and an information processing apparatus.

BACKGROUND

A behavior recognition technique for recognizing a behavior of a person from video data has been known. For example, a technique has been known for recognizing a movement or a behavior of a person using skeleton information of the person in the video data, from the video data captured by a camera or the like. In recent years, for example, with the spread of self-checkout machines in supermarkets and convenience stores and the spread of surveillance cameras in schools, trains, public facilities, or the like, introduction of behavior recognition of persons is advanced.

International Publication Pamphlet No. WO 2019/049216 is disclosed as related art.

SUMMARY

According to an aspect of the embodiments, a non-transitory computer-readable storage medium storing an information processing program that causes at least one computer to execute a process, the process includes acquiring video data that has target objects that include a person and an object; specifying each relationship of each of the target objects in the acquired video data by using graph data that indicates a relationship of each of target object stored in a storage unit; specifying a behavior of the person in the acquired video data by using a feature of the person; and predicting a future behavior of the person or a state of the person by comparing the specified behavior of the person and the specified relationship with a behavior prediction rule, the behavior prediction rule being a rule associated with a future behavior of a person for each combination of a behavior of the person and a relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for explaining a specific example of the behavior prediction;

FIG. 4 is a functional block diagram illustrating a functional configuration of the information processing apparatus according to the first embodiment;

FIG. 6 is a diagram illustrating an example of an expression recognition rule;

FIG. 8 is a diagram illustrating an example of a behavior prediction rule;

FIG. 9 is a diagram for explaining an example of generating a scene graph that illustrates a relationship between a person and an object;

FIG. 16 is a diagram for explaining specification of a relationship;

FIG. 17 is a diagram for explaining a specific specification example of a current behavior of a person;

FIG. 18 is a diagram for explaining another example of the specification of the current behavior of the person;

FIG. 22 is a diagram for explaining a solution example to which behavior prediction related to persons is applied.

DESCRIPTION OF EMBODIMENTS

The behavior of the person recognized by the behavior recognition technique described above indicates a current or past behavior of the person. Therefore, it may be too late to take measures after recognizing that the person has performed a predetermined behavior.

In one aspect, an object is to provide an information processing program, an information processing method, and an information processing apparatus that can detect a situation that needs countermeasures in advance from video data.

According to one embodiment, it is possible to detect a situation that needs countermeasures in advance from video data.

Hereinafter, embodiments of an information processing program, an information processing method, and an information processing apparatus disclosed in the present application will be described in detail with reference to the drawings. Note that the embodiments do not limit the present disclosure. Furthermore, the individual embodiments may be appropriately combined within a range without inconsistency.

First Embodiment

<Overall Configuration>

Figure 1:
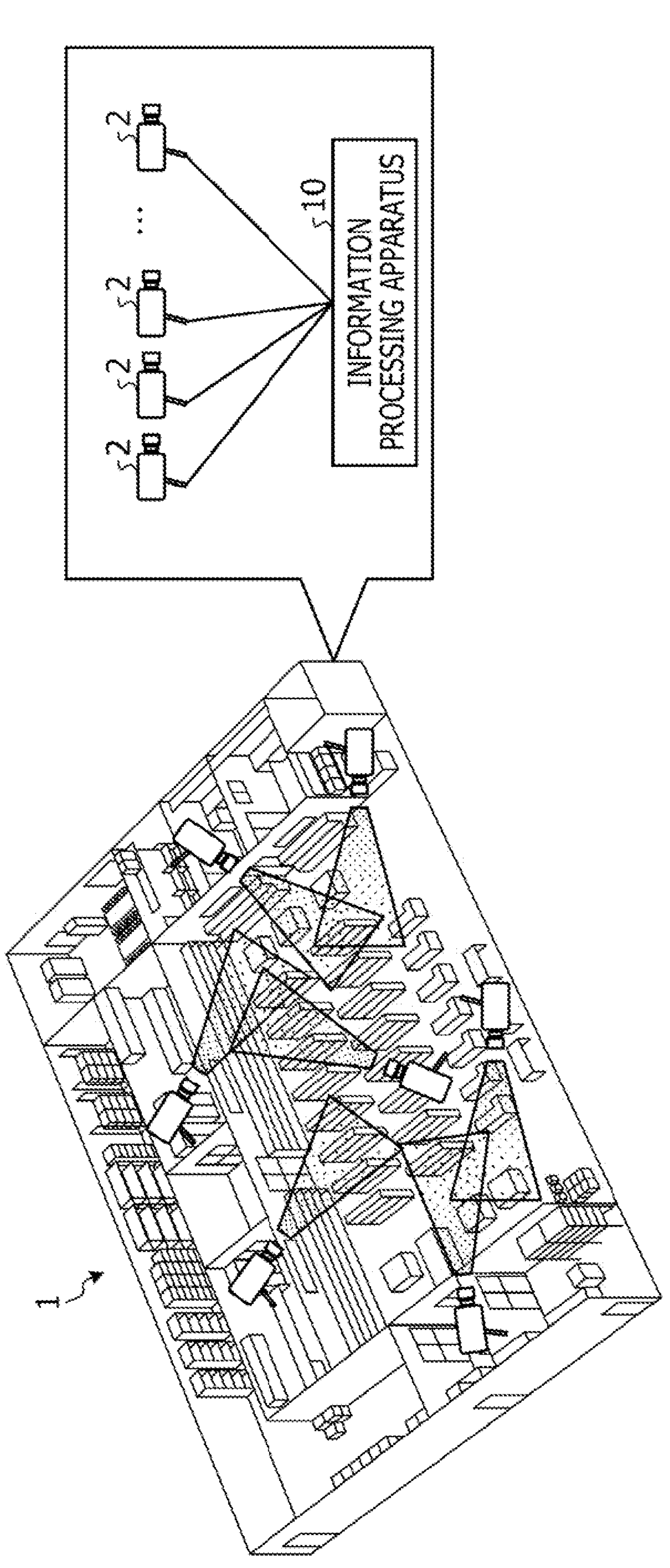
FIG. 1 is a diagram illustrating an overall configuration example of a behavior prediction system according to a first embodiment.

FIG. 1 is a diagram illustrating an overall configuration example of a behavior prediction system according to a first embodiment. As illustrated in FIG. 1, this behavior prediction system includes a store 1 that is an example of a space, a plurality of cameras 2 that is respectively provided in different locations in the store 1, and an information processing apparatus 10 that analyzes video data.

Each of the plurality of cameras 2 is one example of a surveillance camera that images a predetermined area in the store 1, and transmits data of a captured video to the information processing apparatus 10. In the following description, data of a video may be referred to as "video data". Furthermore, the video data includes a plurality of time-series frames. To each frame, a frame number is assigned in a time-series ascending order. One frame is image data of a still image captured by the camera 2 at a certain timing.

The information processing apparatus 10 is one example of a computer that analyzes each piece of the image data captured by each of the plurality of cameras 2. Note that each of the plurality of cameras 2 and the information processing apparatus 10 are connected to each other by using various networks such as the Internet and a dedicated line regardless of whether the network is wired or wireless.

In recent years, surveillance cameras are set not only in the store 1 but also in cities such as platforms of stations, various services aiming for a safe and secure society have been provided using video data acquired by the surveillance cameras. For example, services that detect occurrence of shoplifting, accidents, jumping suicides, or the like and use them for post processing, or the like have been provided. However, all of the services currently provided are post-detection, and it is difficult to say that video data can be effectively used in terms of prevention such as signs of shoplifting, a possibility of suspicious persons, signs of attacks, signs of dementia, Alzheimer's disease, or the like that is difficult to determine at first glance.

Therefore, in the first embodiment, an information processing apparatus 10 will be described that realizes "behavior prediction" for predicting a future behavior or inside of a person by combining "behavior analysis" for analyzing a current expression or behavior of the person and "context sensing" for detecting surrounding environments, objects, and relationships thereof.

Figure 2:
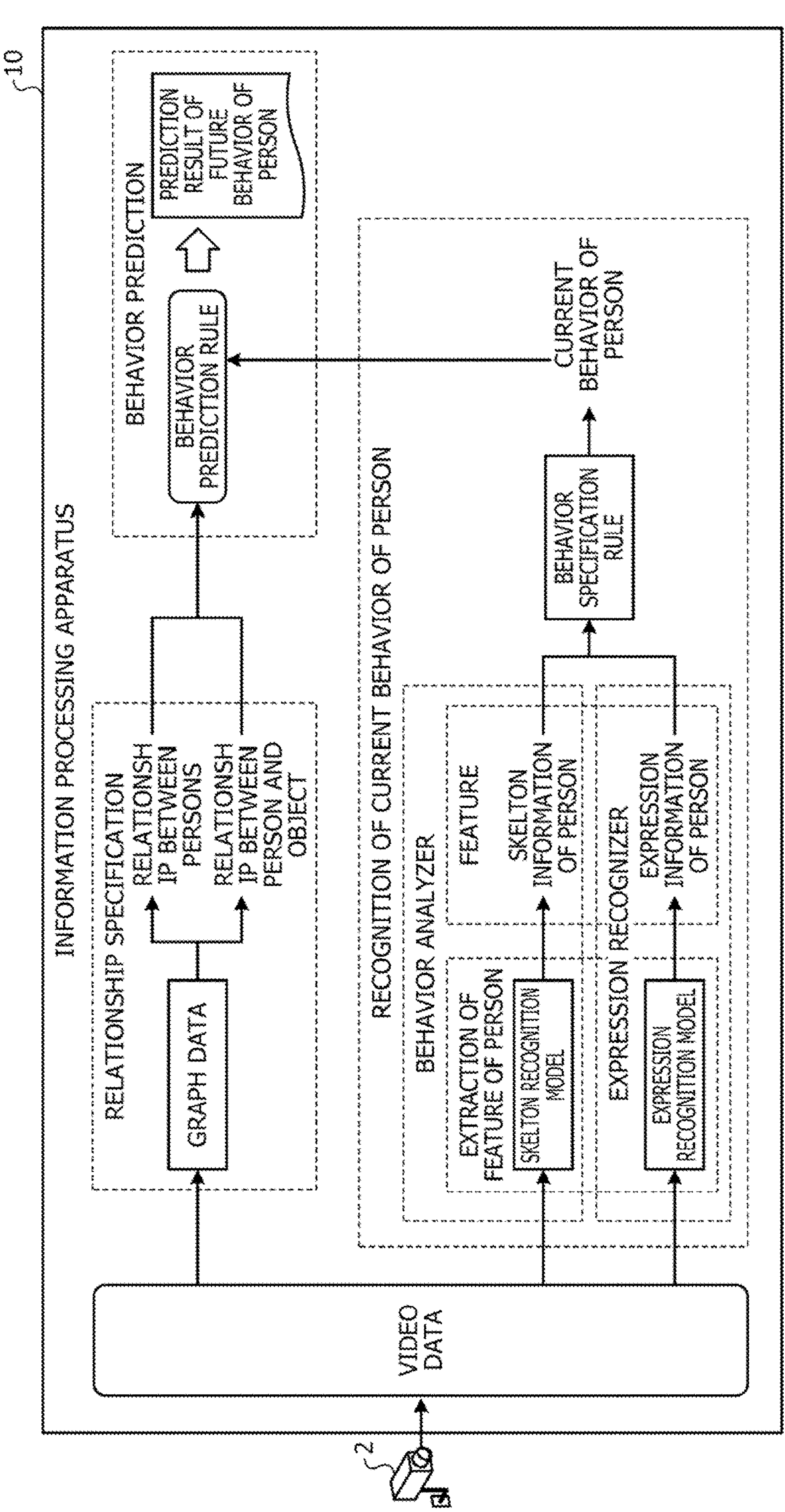
FIG. 2 is a diagram for explaining an information processing apparatus that realizes behavior prediction according to the first embodiment.

FIG. 2 is a diagram for explaining the information processing apparatus 10 that realizes behavior prediction according to the first embodiment. As illustrated in FIG. 2, the information processing apparatus 10 specifies a relationship and recognizes a person's behavior in video data and performs behavior prediction of the person using the specified relationship and the recognized behavior.

For example, the information processing apparatus 10 acquires video data that has target objects that include a person and an object. Then, the information processing apparatus 10 specifies a relationship of each target object in the video data, using graph data that indicates a relationship of each target object stored in a storage unit. On the other hand, the information processing apparatus 10 specifies a current behavior of a person in the video data, using a feature of the person included in the video data. Thereafter, the information processing apparatus 10 predicts a future behavior of the person such as the signs of shoplifting or a state of the person such as Alzheimer's by comparing the specified current behavior of the person and the specified relationship with a preset behavior prediction rule.

For example, as illustrated in FIG. 2, the information processing apparatus 10 specifies a type of a person, a type of an object, or the like included in the video data and searches for graph data such as a scene graph, in which various relationships are predetermined, using the specified information so as to specify a relationship between the persons or a relationship between the person and the object.

Furthermore, the information processing apparatus 10 recognizes a current behavior of the person using a behavior analyzer and an expression analyzer. For example, the behavior analyzer inputs the video data into a trained skeleton recognition model and acquires skeleton information of a person that is an example of the feature. An expression recognizer inputs the video data into a trained expression recognition model and acquires expression information of a person that is an example of the feature. Then, the information processing apparatus 10 refers to a predetermined behavior specification rule and recognizes the current behavior of the person corresponding to a combination of the specified skeleton information and expression information of the person.

Thereafter, the information processing apparatus 10 refers to a behavior prediction rule that is an example of a rule associated with a future behavior of the person for each combination of the behavior of the person and the relationship and predicts a future behavior of the person corresponding to a combination of the relationship between the persons or the relationship between the person and the object and the current behavior of the person.

Here, regarding the behavior predicted by the information processing apparatus 10, long-term prediction can be performed from short-term prediction. FIG. 3 is a diagram for explaining a specific example of the behavior prediction. As illustrated in FIG. 3, the behavior prediction predicted by the information processing apparatus includes not only a "behavior" that can be determined from an appearance of the person such as a purchasing behavior or shoplifting but also "feeling" and a "state" that are difficult to be determined from the appearance of the person such as diseases and are affected by the inside of the person.

For example, the information processing apparatus 10 predicts occurrence, necessity, or the like of "human assistance by robots", "online communication assistance", or the like as very-short-term predictions of several seconds or several minutes ahead. The information processing apparatus 10 predicts occurrence of a sudden event or an event with a small movement amount from a current behavior place such as a "purchasing behavior in a store", "crimes such as shoplifting or stalking", a "suicide behavior", or the like as short-term predictions of several hours ahead. The information processing apparatus 10 predicts occurrence of planned crimes such as "police box attack", "domestic violence", or the like as medium-term predictions of several days ahead. The information processing apparatus 10 predicts occurrence of a possible event (state) that cannot be found from an appearance such as "improvement in performance in study, sales, or the like", "prediction of diseases such as Alzheimer's", or the like as long-term predictions of several months ahead.

In this way, the information processing apparatus 10 can detect a situation that needs countermeasures in advance from the video data and can provide a service for aiming a safe and secure society.

<Functional Configuration>

FIG. 4 is a functional block diagram illustrating a functional configuration of the information processing apparatus 10 according to the first embodiment. As illustrated in FIG. 4, the information processing apparatus 10 includes a communication unit 11, a storage unit 20, and a control unit 30.

The communication unit 11 is a processing unit that controls communication with another device, and is implemented by, for example, a communication interface or the like. For example, the communication unit 11 receives video data or the like from each camera 2 and outputs a processing result of the information processing apparatus 10 or the like to a device or the like that has been designated in advance.

The storage unit 20 is a processing unit that stores various types of data, programs executed by the control unit 30, and the like, and is implemented by, for example, a memory, a hard disk, or the like. The storage unit 20 stores a video data DB 21, a training data DB 22, a graph data DB 23, a skeleton recognition model 24, an expression recognition model 25, an expression recognition rule 26, a higher-order behavior specification rule 27, and a behavior prediction rule 28.

The video data DB 21 is a database that stores video data captured by each of the plurality of cameras 2 installed in the store 1. For example, the video data DB 16 stores video data for each camera 2 or for each time period when the video data is captured.

The training data DB 22 is a database that stores various types of training data used to generate various machine learning models such as the graph data, the skeleton recognition model 24, or the expression recognition model 25. The training data stored here includes supervised training data to which correct answer information is added and unsupervised training data to which the correct answer information is not added.

The graph data DB 23 is a database that stores a scene graph that is an example of the graph data indicating a relationship between target objects included in the video data. For example, the graph data DB 23 stores the scene graph that defines a relationship between persons and/or a relationship between a person and an object. For example, the scene graph is graph data that describes each object (person, product, or the like) included in each piece of the image data in the video data and a relationship between objects.

Figure 5:
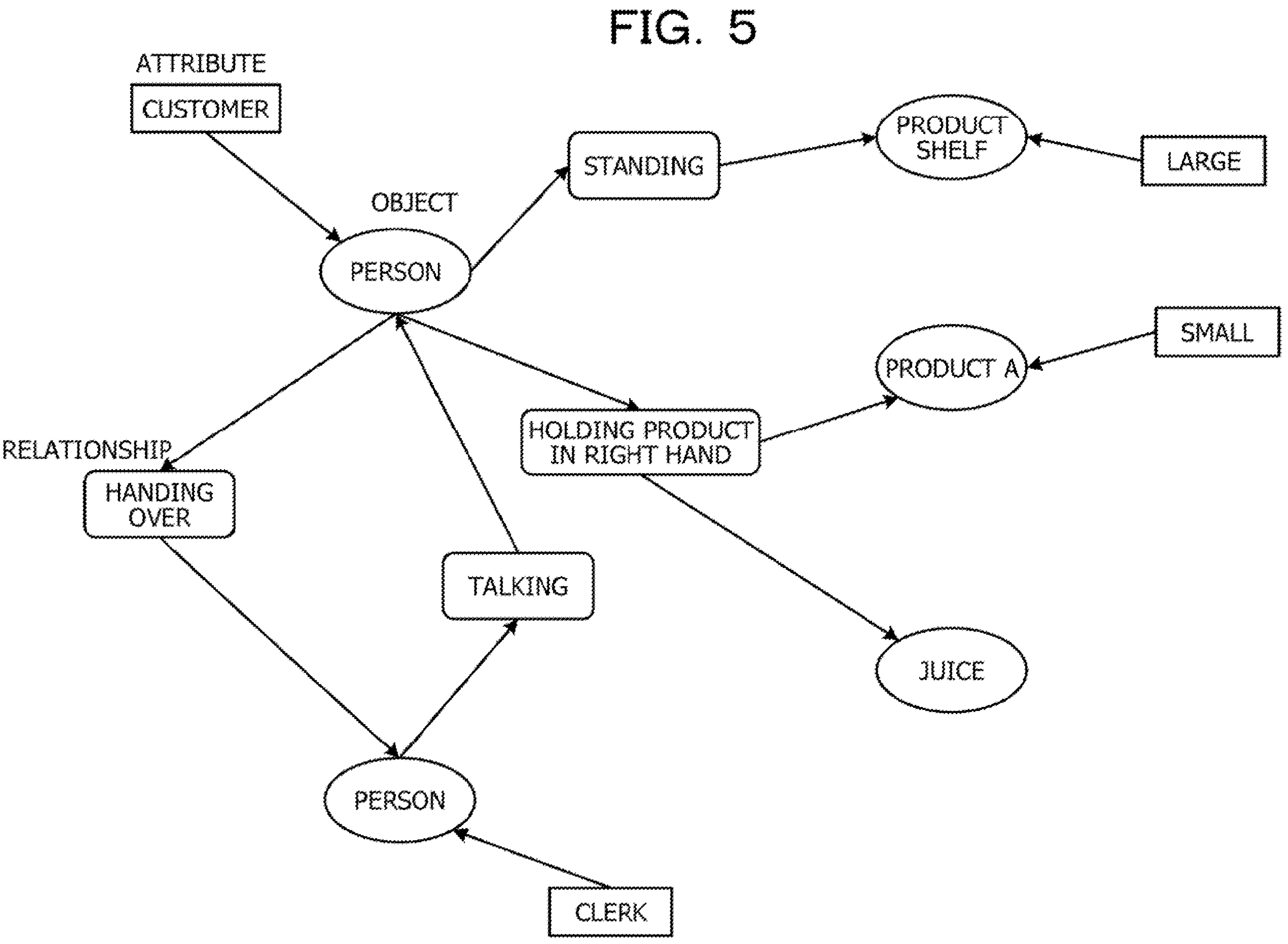
FIG. 5 is a diagram illustrating an example of a scene graph.

FIG. 5 is a diagram illustrating an example of the scene graph. As illustrated in FIG. 5, the scene graph is a directed graph in which an object imaged in image data is set as a node, each node has an attribute (for example, type of object), and a relationship between the nodes is set as a directed edge. The example in FIG. 5 indicates a relationship "talking" from a node "person" with an attribute "clerk" to a node "person" with an attribute "customer". For example, it is defined that there is a relationship "a clerk talks to a customer". Furthermore, a relationship "standing" from the node "person" with the attribute "customer" to a node "product" with an attribute "large" is illustrated. For example, it is defined that there is a relationship "a customer is standing in front of a product shelf of large products".

The relationship indicated here is merely an example. For example, in addition to a simple relationship such as "holding", complex relationships such as "holding a product A in the right hand", "stalking a person walking ahead", or "worried about behind" are included. Note that the graph data DB 23 may store each of the scene graph corresponding to the relationship between the persons and the scene graph corresponding to the relationship between the person and the object and may store a single scene graph including each relationship. Furthermore, although the scene graph is generated by the control unit 30 to be described later, data generated in advance may be used.

The skeleton recognition model 24 is an example of a first machine learning model that generates skeleton information that is an example of a feature of a person. For example, the skeleton recognition model 24 outputs two-dimensional skeleton information in response to an input of image data. For example, the skeleton recognition model 24 is an example of a deep trainer that estimates two-dimensional joint positions (skeleton coordinates) of the head, wrists, waist, ankles, or the like for two-dimensional image data of a person and recognizes a basic movement and recognizes a rule defined by a user.

By using this skeleton recognition model 24, the basic movement of the person can be recognized, and positions of the ankles, a direction of the face, and a direction of the body can be acquired. The basic movements include, for example, walking, running, stopping, or the like. The rule defined by the user is, for example, a transition of skeleton information corresponding to each behavior before a product is picked up. Note that, although the skeleton recognition model 24 is generated by the control unit 30 to be described later, data generated in advance may be used.

The expression recognition model 25 is an example of a second machine learning model that generates expression information regarding an expression that is an example of the feature of the person. For example, the expression recognition model 25 is a machine learning model that estimates an action unit (AU) that is a method for decomposing an expression based on parts and facial expression muscles of the face and quantifying the expression. This expression recognition model 25 outputs an expression recognition result such as "AU 1:2, AU 2:5, AU 4:1, . . . ." that expresses a generation intensity (for example, five-steps evaluation) of each of an AU 1 to an AU 28 set to specify the expression, in response to the input of the image data. Note that, although the expression recognition model 25 is generated by the control unit 30 to be described later, data generated in advance may be used.

The expression recognition rule 26 is a rule used to recognize an expression using the output result of the expression recognition model 25. FIG. 6 is a diagram illustrating an example of the expression recognition rule 26. As illustrated in FIG. 6, the expression recognition rule 26 stores an "expression" and an "estimated result" in association with each other. The "expression" is an expression to be recognized, and the "estimated result" is an intensity of each of the AU 1 to the AU 28 corresponding to each expression. In the example in FIG. 6, it is illustrated that a case of "the AU 1 has an intensity 2, the AU 2 has an intensity 5, and the AU 3 has an intensity 0, . . . " is recognized as an expression "smile". Note that the expression recognition rule 26 is data that is registered in advance by an administrator or the like.

Figure 7:
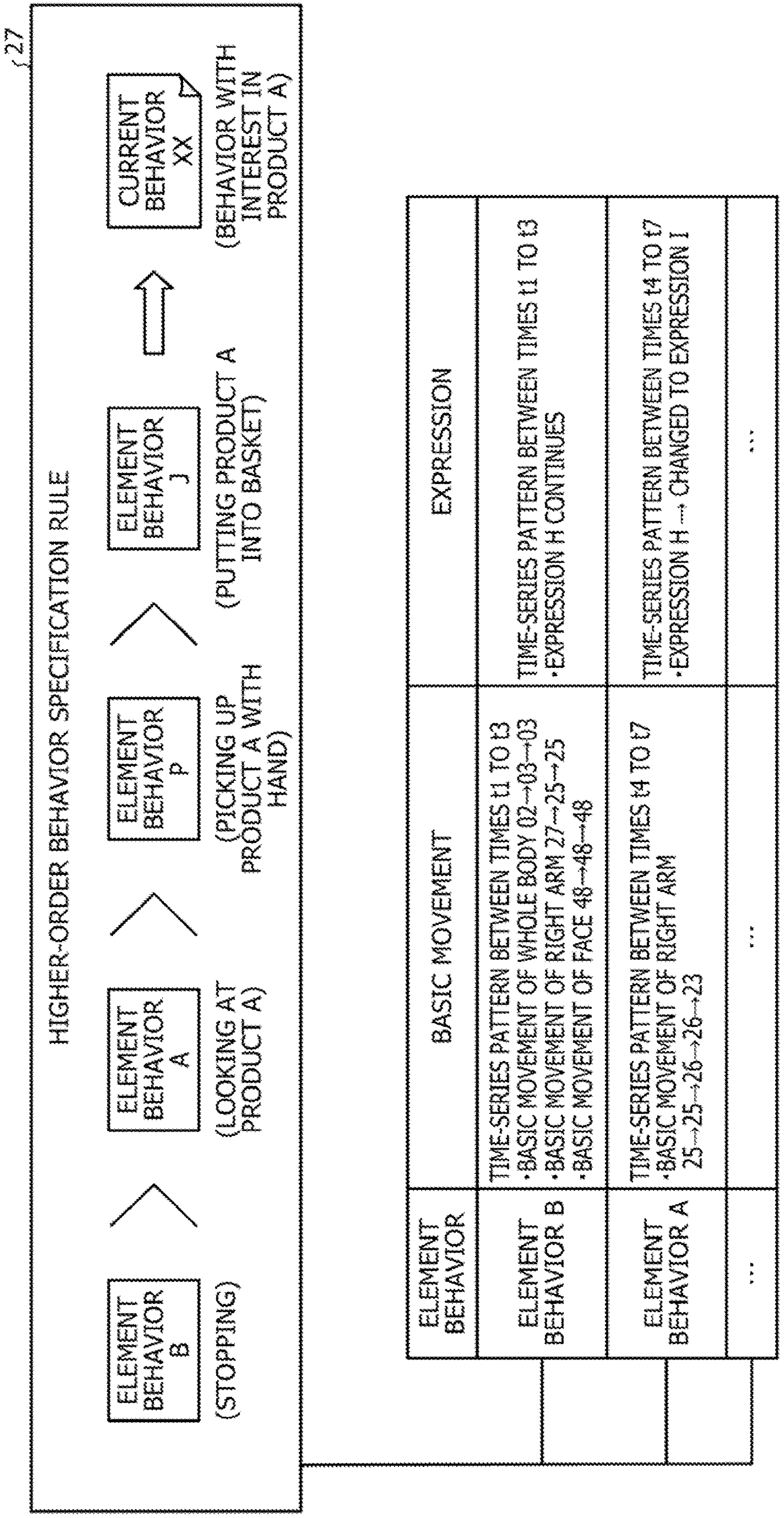
FIG. 7 is a diagram illustrating an example of a higher-order behavior specification rule.

The higher-order behavior specification rule 27 is a rule used to specify a current behavior of a person. FIG. 7 is a diagram illustrating an example of the higher-order behavior specification rule 27. As illustrated in FIG. 7, the higher-order behavior specification rule 27 is a rule that associates the current behavior with a transition of an element behavior performed to specify the current behavior.

In the example in FIG. 7, it is defined to specify a current behavior XX in a case where an element behavior B, an element behavior A, an element behavior P, and an element behavior J are performed in this order. For example, the current behavior XX is “a behavior with an interest in a product A”, the element behavior B is “stopping”, the element behavior A is “looking at the product A”, the element behavior P is “picking up the product A with the hand”, and the element behavior J is “putting the product A into a basket” or the like.

Furthermore, each element behavior is associated with a basic movement and an expression. For example, regarding the element behavior B, the basic movement is defined as “a basic movement of the whole body transitions as basic movements 02, 03, and 03, a basic movement of the right arm transitions as basic movements 27, 25, and 25, and a basic movement of the face transitions as basic movements 48, 48, and 48, as a time-series pattern between a time t1 and a time t3” and the expression is defined as “an expression H continues as the time-series pattern between the time t1 and the time t3”.

Note that the notation such as the basic movement 02 is expressed by an identifier that identifies each basic movement for explanation and, for example, corresponds to stopping, raising an arm, crouching, or the like. Similarly, the notation such as the expression H is expressed by an identifier that identifies each expression for explanation and, for example, corresponds to a smiling face, an angry face, or the like. Note that, although the higher-order behavior specification rule 27 is generated by the control unit 30 to be described later, data generated in advance may be used.

The behavior prediction rule 28 is an example of a rule that associates a future behavior of a person for each combination of the behavior of the person and the relationship. FIG. 8 is a diagram illustrating an example of the behavior prediction rule 28. As illustrated in FIG. 8, the behavior prediction rule 28 defines a content of future behavior prediction for each combination of a current behavior and a relationship.

The example in FIG. 8 illustrates, in a case where the current behavior is “picking up the product A” and the relationship is “holding”, “purchasing the product A 10 minutes later” is predicted. Furthermore, it is illustrated that “moving to a food department” is predicted in a case where the current behavior is “picking up the product A” and the relationship is “putting into a basket”. Furthermore, it is illustrated that “attacking a target” is predicted in a case where the current behavior is “following” and the relationship is “stalking”. Note that the behavior prediction rule 28 is generated by an administrator or the like using a past history or the like.

Returning to FIG. 4, the control unit 30 is a processing unit that controls the entire information processing apparatus 10 and is implemented by, for example, a processor or the like. The control unit 30 includes a preprocessing unit 40 and an operation processing unit 50. Note that the preprocessing unit 40 and the operation processing unit 50 are implemented by an electronic circuit included in a processor, a process executed by a processor, or the like.

<Preprocessing Unit 40>

The preprocessing unit 40 is a processing unit that generates each model, rules, or the like, using the training data stored in the storage unit 20, prior to an operation of the behavior prediction. The preprocessing unit 40 includes a graph generation unit 41, a skeleton recognition model generation unit 42, an expression recognition model generation unit 43, and a rule generation unit 44.

(Generation of Scene Graph)

The graph generation unit 41 is a processing unit that generates a scene graph stored in the graph data DB 23. For example, the graph generation unit 41 generates a scene graph indicating a relationship between persons and a scene graph indicating a relationship between a person and an object, using a recognition model that performs person recognition, object recognition, or the like on image data.

Figure 9:
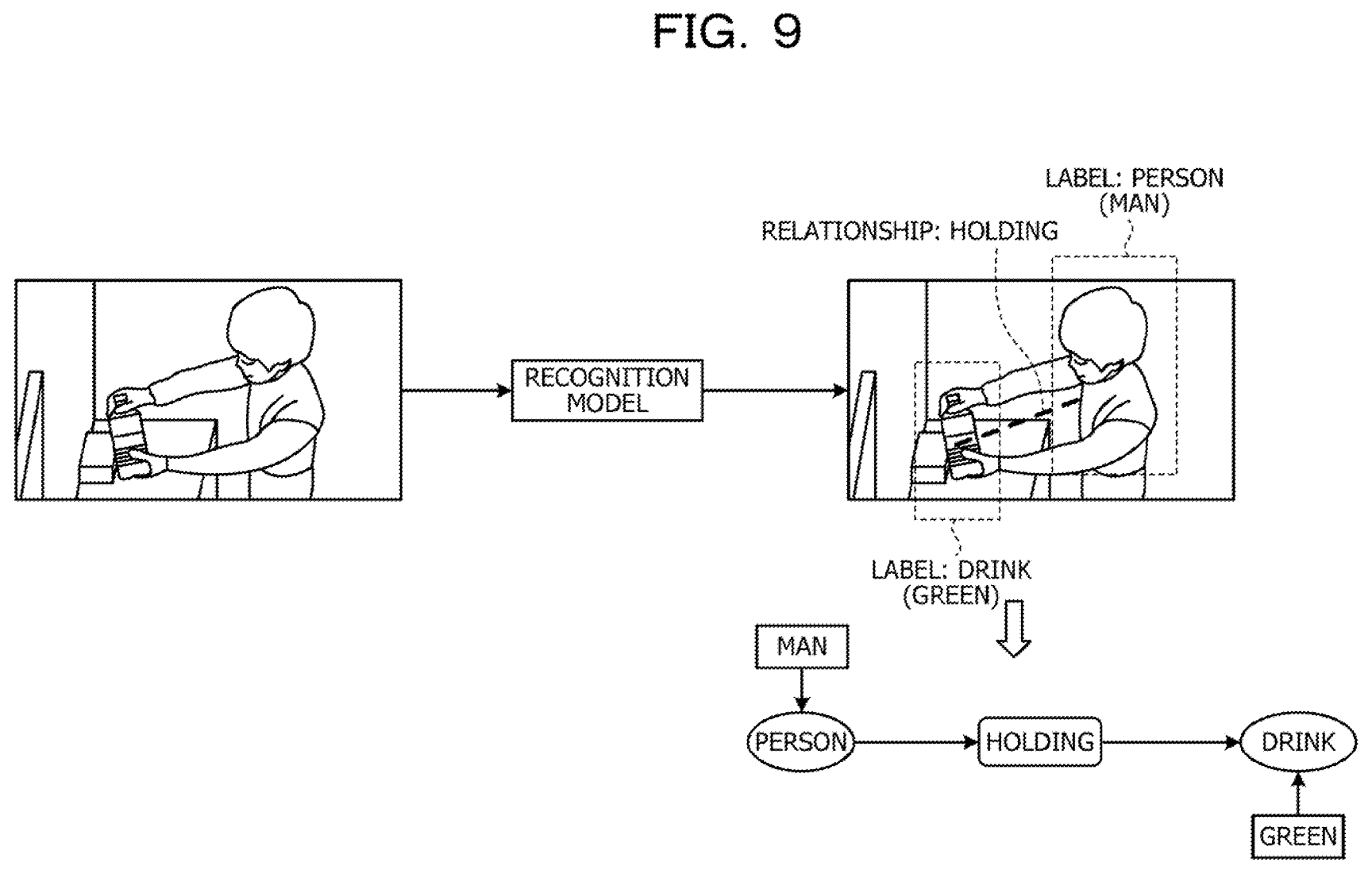

FIG. 9 is a diagram for explaining an example of generating the scene graph that indicates the relationship between the person and the object. As illustrated in FIG. 9, the graph generation unit 41 inputs the image data into the recognition model and acquires a label “person (man)”, a label “drink (green)”, and a relationship “holding” as an output result of the recognition model. For example, the graph generation unit 41 acquires that “a man is holding a green drink”. As a result, the graph generation unit 41 generates a scene graph that associates a relationship “holding” from a node “person” with an attribute “man” to a node “drink” with an attribute “green”.

Figure 10:
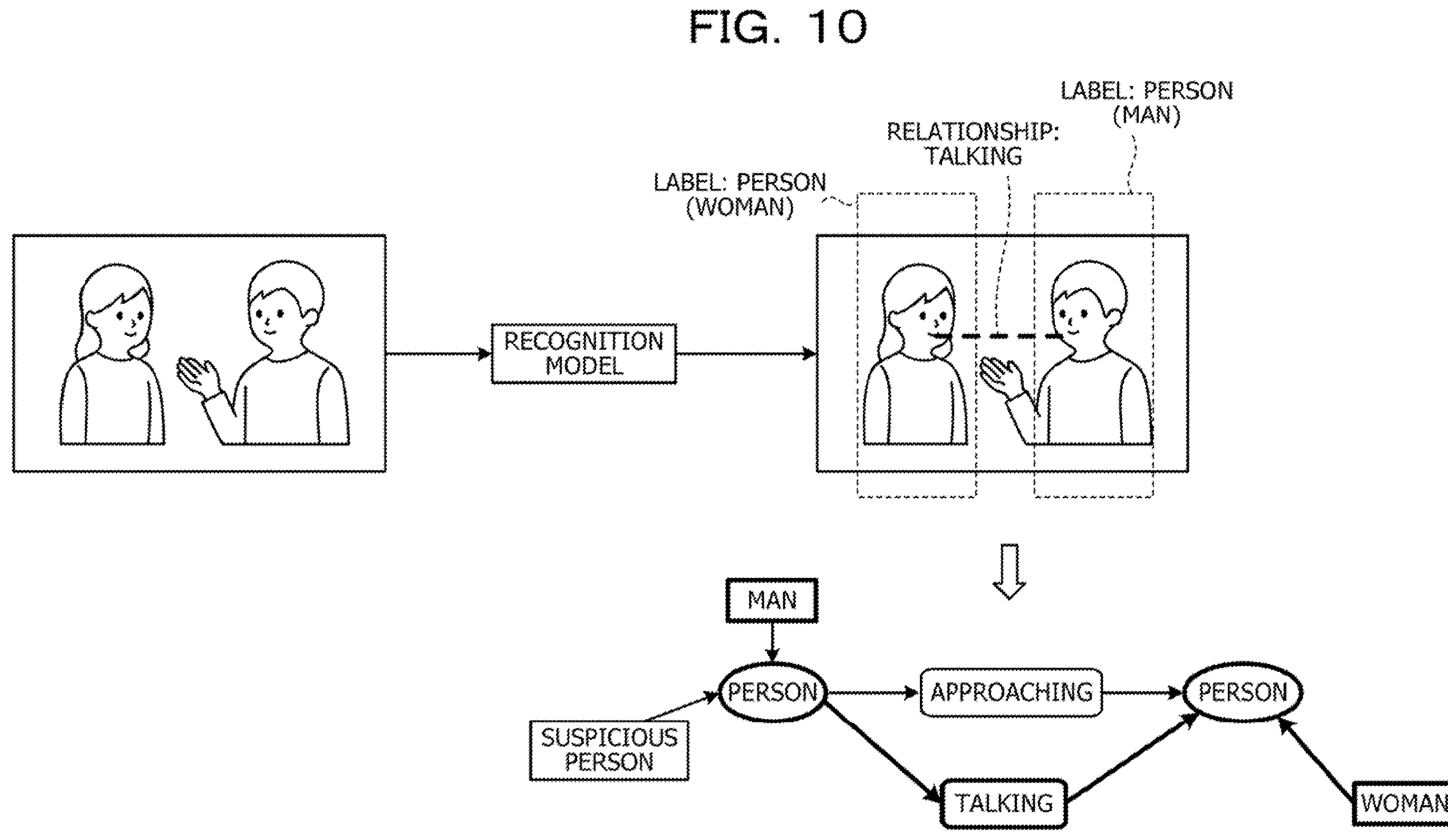
FIG. 10 is a diagram for explaining an example of generating a scene graph illustrating a relationship between persons.

FIG. 10 is a diagram for explaining an example of generating the scene graph that indicates the relationship between the persons. As illustrated in FIG. 10, the graph generation unit 41 inputs the image data into the recognition model and acquires a label “person (man)”, a label “person (woman)”, and a relationship “talking” as an output result of the recognition model. For example, the graph generation unit 41 acquires that “a man is talking to a woman”. As a result, the graph generation unit 41 adds the relationship “talking” from the node “person” with the attribute “man” to the node “person” with the attribute “woman” to a scene graph that has a relationship “approaching” from a node “person” with an attribute “suspicious person” to the node “person” with the attribute “woman”.

Note that the generation of the scene graph is merely an example, and other methods can be used, and the scene graph can be manually generated by an administrator or the like.

(Generation of Skeleton Recognition Model 24)

The skeleton recognition model generation unit 42 is a processing unit that generates the skeleton recognition model 24, using training data. For example, the skeleton recognition model generation unit 42 generates the skeleton recognition model 24 through supervised training using the training data with the correct answer information (label).

Figure 11:
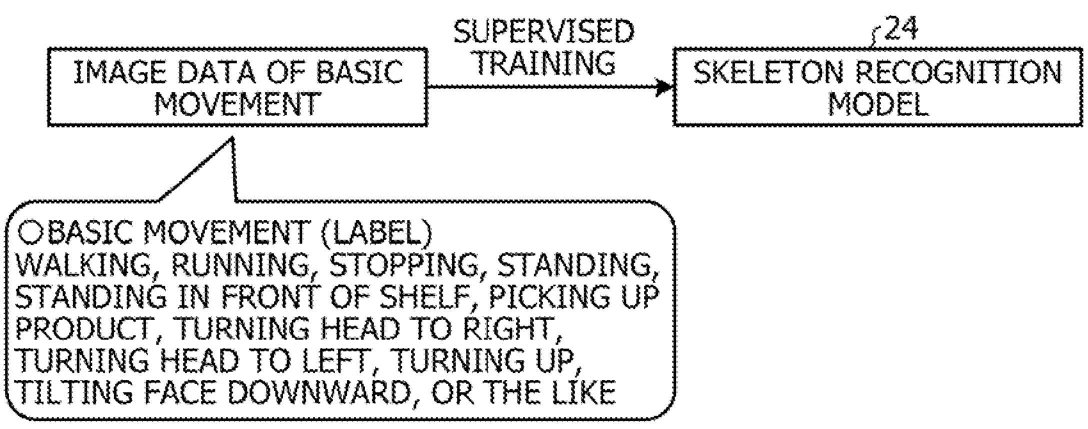
FIG. 11 is a diagram for explaining generation of a skeleton recognition model.

FIG. 11 is a diagram for explaining the generation of the skeleton recognition model 24. As illustrated in FIG. 11, the skeleton recognition model generation unit 42 inputs image data of a basic movement to which a basic movement label is added into the skeleton recognition model 24 and performs machine learning of the skeleton recognition model 24 so as to reduce an error between the output result of the skeleton recognition model 24 and the label. For example, the skeleton recognition model 24 is a neural network. The skeleton recognition model generation unit 42 changes a parameter of the neural network by performing the machine learning of the skeleton recognition model 24. The skeleton recognition model 24 inputs an explanatory variable that is image data (for example, image data of person performing movement of basic movement) into the neural network. Then, the skeleton recognition model 24 generates a machine learning model of which the parameter of the neural network is changed, so as to reduce an error between an output result output from the neural network and the correct answer data that is a basic movement label.

Note that, as the training data, each piece of the image data, to which “walking”, “running”, “stopping”, “standing”, “standing in front of a shelf”, “picking up a product”, "turning the head to the right", "turning the head to the left", "turning up", "tilting the head downward", or the like is added as the "label", can be used. Note that the generation of the skeleton recognition model 24 is merely an example, and other methods can be used. Furthermore, as the skeleton recognition model 24, behavior recognition disclosed in Japanese Laid-open Patent Publication No. 2020-71665 and Japanese Laid-open Patent Publication No. 2020-77343 can be used.

(Generation of Expression Recognition Model 25)

The expression recognition model generation unit 43 is a processing unit that generates the expression recognition model 25, using training data. For example, the expression recognition model generation unit 43 generates the expression recognition model 25 through supervised training using the training data with the correct answer information (label).

Figure 12:
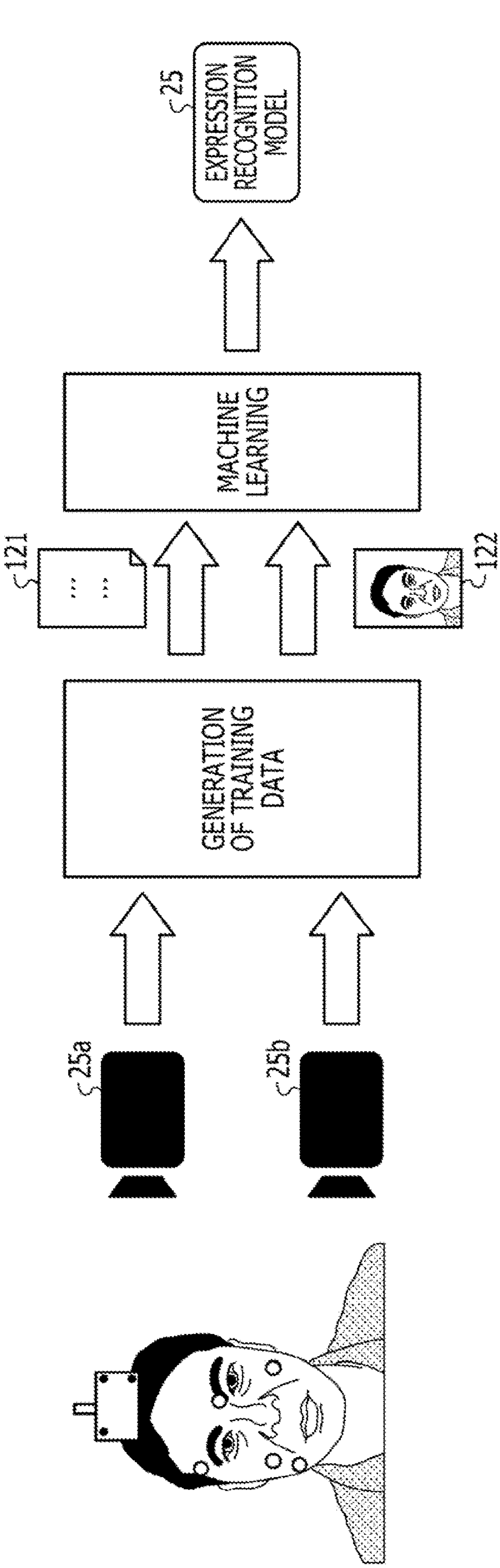
FIG. 12 is a diagram for explaining an example of generating an expression recognition model.

Here, the generation of the expression recognition model 25 will be described with reference to FIGS. 12 to 14C. FIG. 12 is a diagram for explaining an example of generating the expression recognition model 25. As illustrated in FIG. 12, the expression recognition model generation unit 43 generates training data and performs machine learning for image data captured by each of a red, green, blue (RGB) camera 25*a* and an infrared (IR) camera 25*b*.

As illustrated in FIG. 12, first, the RGB camera 25*a* and the IR camera 25*b* are directed to a person with a marker. For example, the RGB camera 25*a* is a general digital camera, and receives visible light and generates an image. Furthermore, for example, the IR camera 25*b* senses infrared rays. Furthermore, the markers are, for example, IR reflection (retroreflection) markers. The IR camera 25*b* is capable of performing motion capture by utilizing the IR reflection by the markers. Furthermore, in the following description, a person to be imaged will be referred to as a subject.

In the training data generation processing, the expression recognition model generation unit 43 acquires the image data captured by the RGB camera 25*a* and a result of the motion capture by the IR camera 25*b*. Then, the expression recognition model generation unit 43 generates an AU generation intensity 121 and image data 122 obtained by deleting a marker from the captured image data through image processing. For example, the generation intensity 121 may be data in which each AU generation intensity is expressed with the five-steps evaluation from A to E and annotation is performed as "AU 1:2, AU 2:5, AU 4:1, . . . ".

In the machine learning processing, the expression recognition model generation unit 43 performs machine learning using the image data 122 and the AU generation intensity 121 output from the training data generation processing and generates the expression recognition model 25 used to estimate the AU generation intensity from the image data. The expression recognition model generation unit 43 can use the AU generation intensity as a label.

Figure 13:
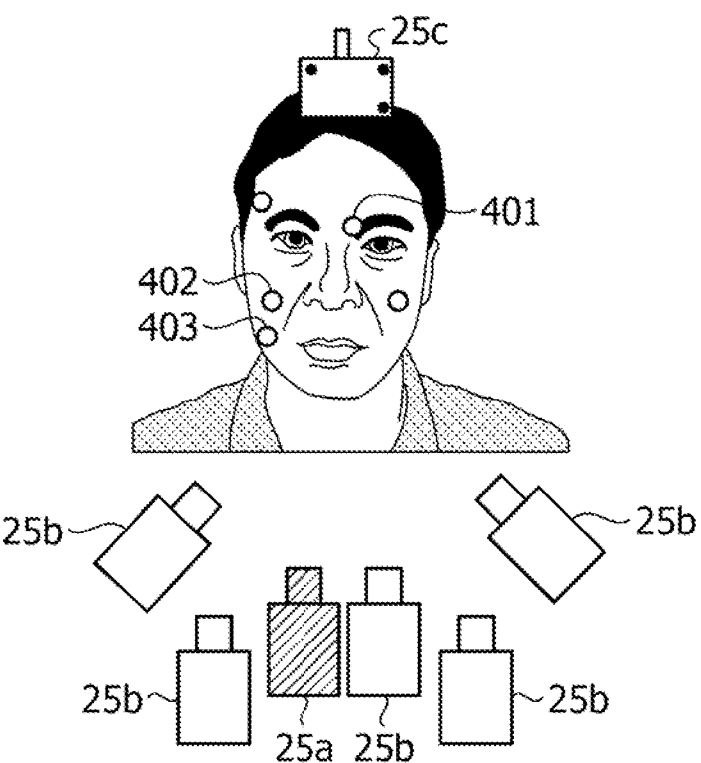
FIG. 13 is a diagram illustrating a camera arrangement example.

Here, camera arrangement will be described with reference to FIG. 13. FIG. 13 is a diagram illustrating a camera arrangement example. As illustrated in FIG. 13, the plurality of IR cameras 25*b* may form a marker tracking system. In that case, the marker tracking system may detect a position of the IR reflection marker by stereo imaging. Furthermore, it is assumed that a relative positional relationship between each of the plurality of IR cameras 25*b* be corrected in advance through camera calibration.

Furthermore, a plurality of markers is attached to the face of the subject to be imaged to cover the AU 1 to the AU 28. Positions of the markers change according to a change in an expression of the subject. For example, a marker 401 is arranged near the root of the eyebrow. Furthermore, a marker 402 and a marker 403 are arranged near the nasolabial lines. The markers may be arranged on the skin corresponding to movements of the one or more AUs and facial expression muscles. Furthermore, the markers may be arranged as avoiding positions on the skin where a texture change is larger due to wrinkling or the like.

Moreover, the subject wears an instrument 25*c* to which a reference point marker is added outside the contour of the face. It is assumed that a position of the reference point marker attached to the instrument 25*c* do not change even when the expression of the subject changes. Accordingly, the expression recognition model generation unit 43 can detect a positional change of the markers attached to the face based on a change in the position relative to the reference point marker. Furthermore, by setting the number of the reference point markers to be equal to or more than three, the expression recognition model generation unit 43 can specify a position of the marker in a three-dimensional space.

The instrument 25*c* is, for example, a headband. Furthermore, the instrument 25*c* may be a virtual reality (VR) headset, a mask made of a hard material, or the like. In that case, the expression recognition model generation unit 43 can use a rigid surface of the instrument 25*c* as the reference point marker.

Note that, when the IR camera 25*b* and the RGB camera 25*a* perform imaging, the subject changes his or her expression. As a result, it is possible to acquire, as an image, how the expression changes as time passes. Furthermore, the RGB camera 25*a* may capture a moving image. A moving image may be regarded as a plurality of still images arranged in time series. Furthermore, the subject may change the expression freely, or may change the expression according to a predetermined scenario.

Note that the AU generation intensity can be determined according to a marker movement amount. For example, the expression recognition model generation unit 43 can determine a generation intensity based on the marker movement amount calculated based on a position that is set in advance as a determination criterion and a distance from the position of the marker.

Figures 14A, 14B, 14C:
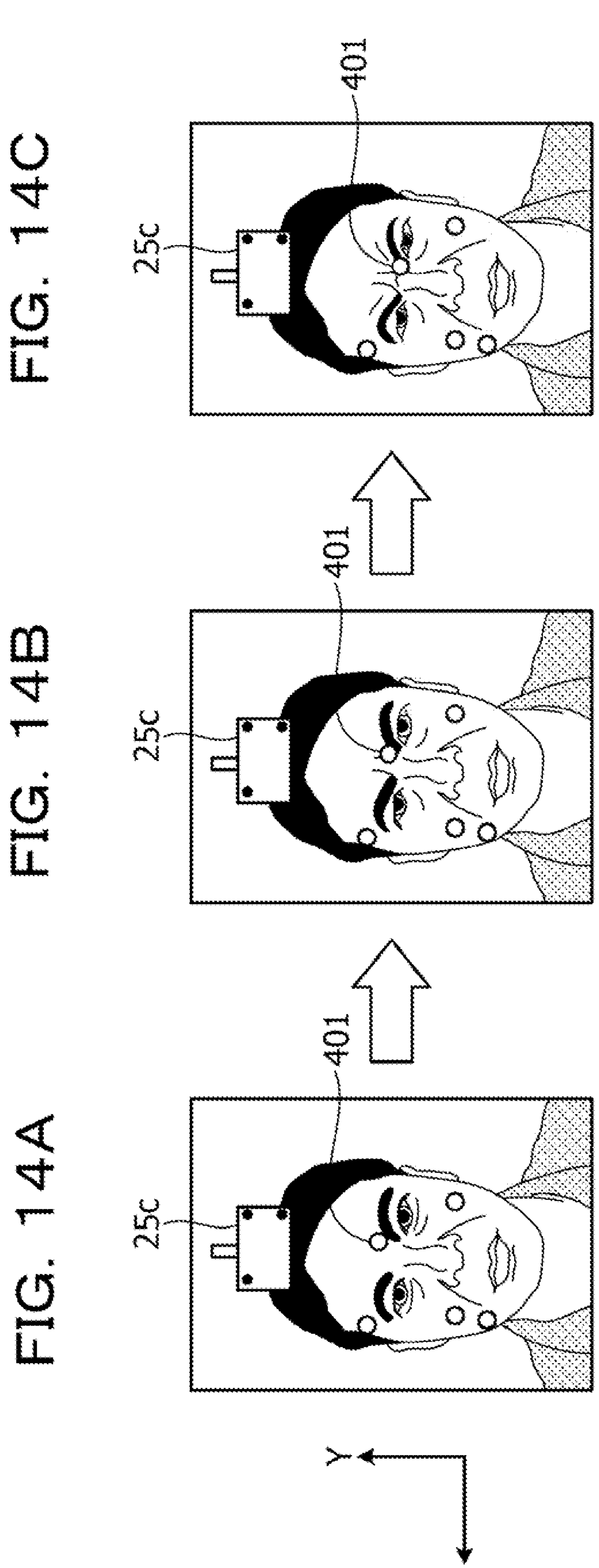
FIGS. 14A to 14C are diagrams for explaining a movement of a marker.

Here, a movement of a marker will be described with reference to FIGS. 14A to 14C. FIGS. 14A to 14C are diagrams for explaining the movement of the marker. FIGS. 14A to 14C are images captured by the RGB camera 25*a*. Furthermore, it is assumed that the images be captured in order of FIG. 14A to FIG. 14C. For example, FIG. 14A is an image when the subject is expressionless. The expression recognition model generation unit 43 can regard a position of a marker in the image of FIG. 14A as a reference position at which the movement amount is zero. As illustrated in FIGS. 14A to 14C, the subject gives an expression of drawing the eyebrows together. At this time, the position of the marker 401 moves downward as the expression changes. At that time, the distance between the position of the marker 401 and the reference point marker attached to the instrument 25*c* increases.

In this way, the expression recognition model generation unit 43 specifies image data in which an expression of the subject is imaged and an intensity of each marker at the time of that expression and generates training data having an explanatory variable "image data" and an objective variable "an intensity of each marker". Then, the expression recognition model generation unit 43 generates the expression recognition model 25 through supervised training using the generated training data. For example, the expression recognition model 25 is a neural network. The expression recognition model generation unit 43 changes a parameter of the neural network by performing machine learning of the expression recognition model 25. The expression recognition model 25 inputs an explanatory variable into the neural network. Then, the expression recognition model 25 generates a machine learning model of which the parameter of the neural network is changed, so as to reduce an error between an output result output from the neural network and correct answer data that is an objective variable.

Note that the generation of the expression recognition model 25 is merely an example, and other methods can be used. Furthermore, as the expression recognition model 25, behavior recognition disclosed in Japanese Laid-open Patent Publication No. 2021-111114 can be used.

(Generation of Higher-Order Behavior Specification Rule 27)

Returning to FIG. 4, the rule generation unit 44 is a processing unit that generates the higher-order behavior specification rule 27, using a past history or the like. For example, the rule generation unit 44 generates the higher-order behavior specification rule 27 by specifying transitions of a movement and an expression before a person performs a certain behavior, from various types of video data in the past.

Figure 15:
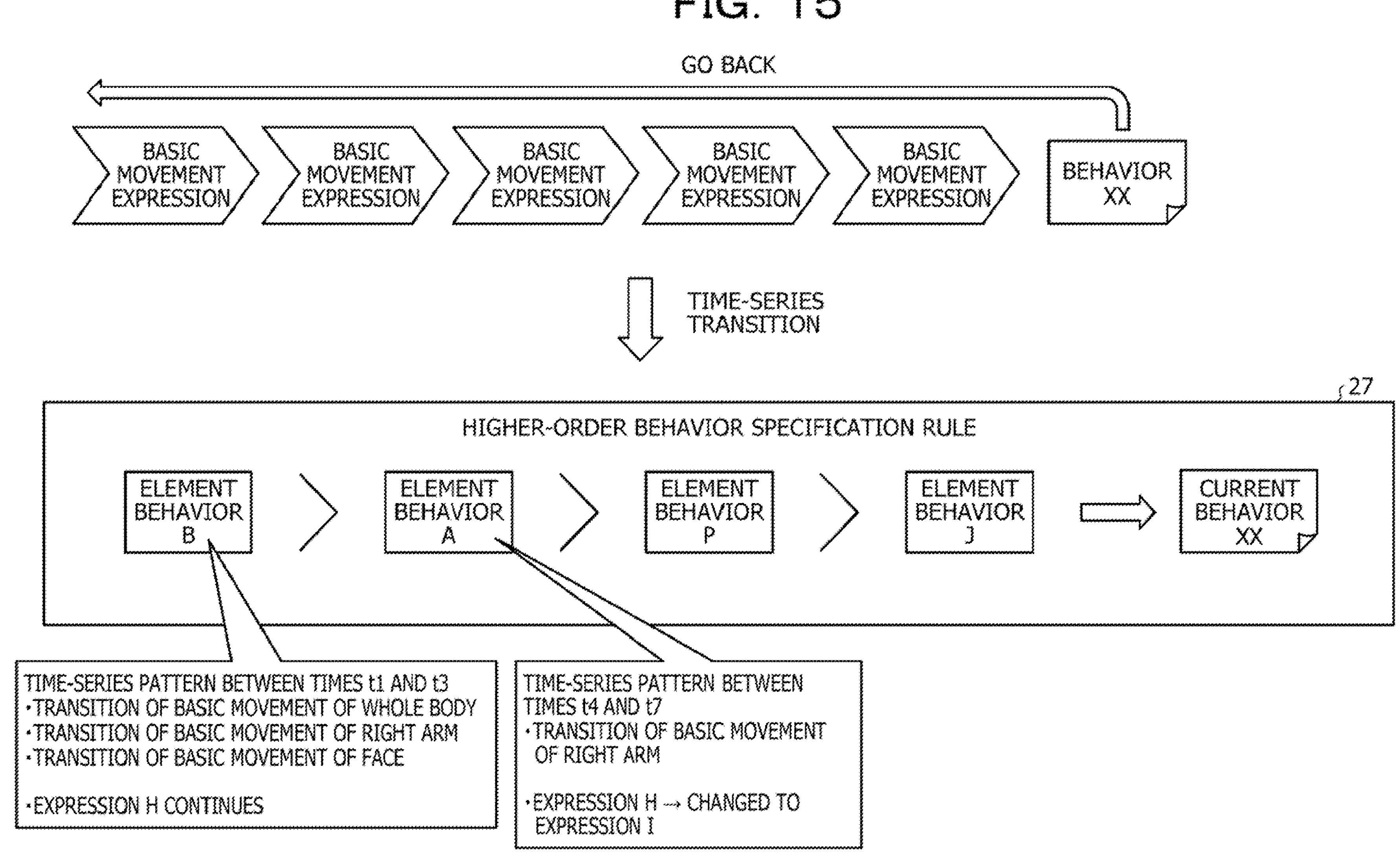
FIG. 15 is a diagram for explaining an example of generating the higher-order behavior specification rule.

FIG. 15 is a diagram for explaining an example of generating the higher-order behavior specification rule. As illustrated in FIG. 15, the rule generation unit 44 extracts a plurality of pieces of image data in the past that has been acquired up to the image data, as going back a predetermined period of time from image data where a certain behavior XX is performed. Then, the rule generation unit 44 detects a basic movement and an expression using a trained model, image analysis, or the like, for each piece of the image data in the past acquired retroactively.

Thereafter, the rule generation unit 44 specifies a transition of an element behavior (transition of basic movement and transition of expression) detected before the behavior XX. For example, the rule generation unit 44 specifies "a transition of the basic movement of the whole body, a transition of the basic movement of the right arm, and a transition of the basic movement of the face between the times t1 to t3" and "continuation of the expression H between the times t1 to t3" as the element behavior B. Furthermore, the rule generation unit 44 specifies "a transition of the basic movement of the right arm between times t4 to t7 and a change from the expression H to an expression I" as the element behavior A.

In this way, the rule generation unit 44 specifies the order of the element behaviors B, A, P, and J as the transition of the element behaviors before the behavior XX. Then, the rule generation unit 44 generates the higher-order behavior specification rule 27 that associates the "behavior XX" with the "transition of the element behaviors B, A, P, and J" and stores the higher-order behavior specification rule 27 in the storage unit 20.

Note that the generation of the higher-order behavior specification rule 27 is merely an example, other methods can be used, and the higher-order behavior specification rule 27 can be manually generated by an administrator or the like.

<Operation Processing Unit 50>

Returning to FIG. 4, the operation processing unit 50 is a processing unit that includes an acquisition unit 51, a relationship specification unit 52, a behavior specification unit 53, and a behavior prediction unit 54 and executes behavior prediction processing for predicting a future behavior of a person imaged in video data, using each model and each rule prepared in advance by the preprocessing unit 40.

The acquisition unit 51 is a processing unit that acquires video data from each camera 2 and stores the video data into the video data DB 21. For example, the acquisition unit 51 may acquire the video data from each camera 2 as needed or may periodically acquire the video data.

(Specification of Relationship)

The relationship specification unit 52 is a processing unit that executes relationship specification processing of specifying a relationship between persons imaged in video data or a relationship between a person and an object, according to the scene graph stored in the graph data DB 23. For example, the relationship specification unit 52 specifies a type of a person and a type of an object imaged in a frame, for each frame included in the video data and searches for a scene graph using each piece of the specified information so as to specify the relationship. Then, the relationship specification unit 52 outputs the specified relationship to the behavior prediction unit 54.

FIG. 16 is a diagram for explaining specification of a relationship. As illustrated in FIG. 16, the relationship specification unit 52 specifies a type of a person, a type of an object, the number of persons, or the like in a frame 1, according to a result obtained by inputting the frame 1 into a machine-learned machine learning model and known image analysis on the frame 1, for the frame 1. For example, the relationship specification unit 52 specifies a "person (customer)" and a "person (clerk)" as the type of the person. Thereafter, the relationship specification unit 52 specifies a relationship "a clerk talks to a customer" between a node "person" with an attribute "customer" and a node "person" with an attribute "clerk" according to the scene graph. The relationship specification unit 52 specifies a relationship "talking", a relationship "handing over", or the like for each frame, by executing the relationship specification processing described above for each subsequent frame such as a frame 2 or 3.

(Specification of Current Behavior)

The behavior specification unit 53 is a processing unit that specifies a current behavior of a person from video data. For example, the behavior specification unit 53 acquires skeleton information of each part of the person using the skeleton recognition model 24 and specifies an expression of the person using the expression recognition model 25 for each frame in the video data. Then, the behavior specification unit 53 specifies the behavior of the person using the skeleton information of each part of the person and the expression of the person specified for each frame and outputs the specified behavior to the behavior prediction unit 54.

FIG. 17 is a diagram for explaining a specific specification example of the current behavior of the person. As illustrated in FIG. 17, the behavior specification unit 53 inputs the frame 1 that is image data into the skeleton recognition model 24 and the expression recognition model 25. The skeleton recognition model 24 generates the skeleton information of each part according to the input of the frame 1 and outputs a movement of each part according to the skeleton information of each part. For example, the behavior specification unit 53 can acquire movement information of each part such as "face: facing forward, arm: raising, foot: walking, . . . ", by using the skeleton recognition model 24. Furthermore, the expression recognition model 25 outputs each AU generation intensity "AU 1:2, AU 2:5, AU 4:1, . . . ." of the AU 1 to the AU 28 as the expression recognition result, in response to the input of the frame 1. Then, the behavior specification unit 53 collates the expression recognition result with the expression recognition rule 26 and specifies an expression "smile" or the like.

The behavior specification unit 53 executes the specification processing described above on each subsequent frame such as the frame 2 or 3 and specifies movement information of each part and an expression of a person imaged in the frame, for each frame.

Then, the behavior specification unit 53 specifies a transition of the movement of each part and a transition of the expression of the person, by executing the specification processing described above for each frame. Thereafter, the behavior specification unit 53 compares the transition of the movement of each part and the transition of the expression of the person with each element behavior of the higher-order behavior specification rule 27 and specifies the element behavior B.

Moreover, the behavior specification unit 53 specifies a transition of the element behavior by repeating the specification of the element behavior from the video data. Then, the behavior specification unit 53 can specify the current behavior XX of the person imaged in the video data by comparing the transition of the element behavior with the higher-order behavior specification rule 27.

Note that, in the example in FIG. 17, an example has been described in which both of the movement of each part and the expression are specified for each frame. However, the embodiment is not limited to this. For example, because the expression of the person is affected by an inner change of the person, an expression when a certain behavior is performed is not limited to an expression that expresses an inside at the time of the behavior. For example, in a case where the expression changes after a certain behavior is performed, the expression often changes before and after the certain behavior is performed. Therefore, the behavior specification unit 53 can specify the expression by using a frame different from the frame used for the movement specification of each part.

FIG. 18 is a diagram for explaining another example of the specification of the current behavior of the person. In FIG. 18, an example will be described in which the frames 1, 2, and 3 are assumed as a single processing unit, a movement is specified in each frame, and an expression is recognized in the latest frame (frame 3 in this example). As illustrated in FIG. 18, the behavior specification unit 53 performs the skeleton recognition using the skeleton recognition model 24 for the frames 1, 2, and 3 as in FIG. 17 and specifies a movement of each part for each frame. On the other hand, the behavior specification unit 53 inputs the frame 3 into the expression recognition model 25 and specifies an expression of a person.

Thereafter, the behavior specification unit 53 specifies an element behavior and specifies a current behavior as in FIG. 17. Note that, the example described here is merely an example, and the behavior specification unit 53 may specify the movement of each part in each frame and may recognize the expression in the first frame. Furthermore, while the behavior specification unit 53 specifies the movement in each frame, the behavior specification unit 53 can specify an expression formed between frames and a transition of the expression using a plurality of frames (frames 1 to 3 in FIG. 18) regarding the expression recognition.

(Future Behavior Prediction)

The behavior prediction unit 54 is a processing unit that performs future behavior prediction of a person using a current behavior of a person and a relationship. For example, the behavior prediction unit 54 searches for the behavior prediction rule 28 using the relationship specified by the relationship specification unit 52 and the current behavior of the person specified by the behavior specification unit 53 and predicts the future behavior of the person. Then, the behavior prediction unit 54 transmits a prediction result to an administrator's terminal or displays the prediction result on a display or the like.

Figure 19:
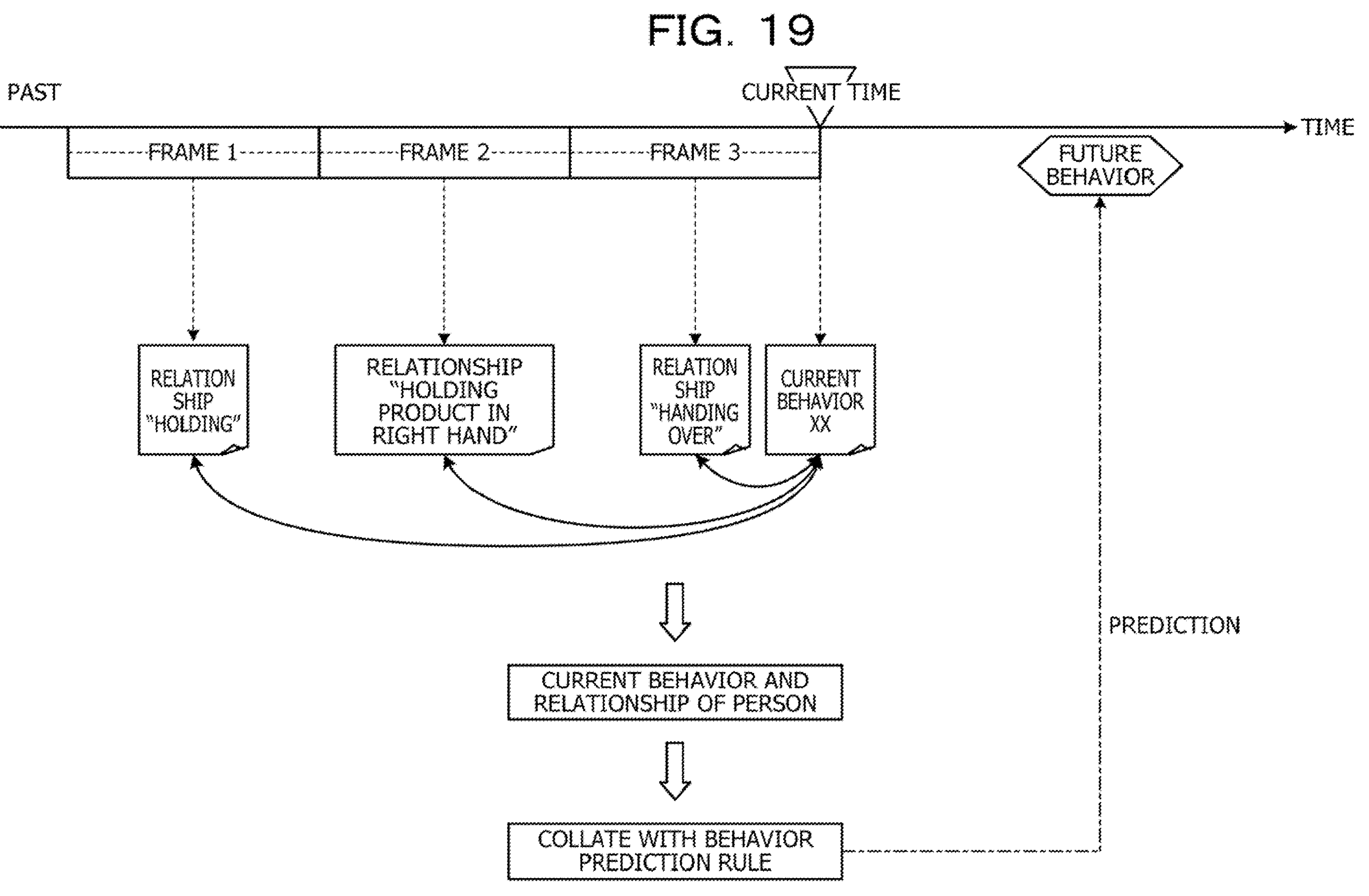
FIG. 19 is a diagram for explaining behavior prediction of a person.

FIG. 19 is a diagram for explaining behavior prediction of a person. As illustrated in FIG. 19, the behavior prediction unit 54 acquires a relationship "holding" specified at the point of time of the frame 1, acquires a relationship "holding a product in the right hand" specified at the point of time of the frame 2, and acquires a relationship "holding" specified at the point of time of the frame 3 and the current behavior XX at the point of time. Then, the behavior prediction unit 54 predicts the behavior of the person by searching for the behavior prediction rule 28, using the latest relationship and the current behavior XX.

For example, when an example in FIG. 8 is described, in a case where the current behavior is "holding a product A in the hand" and the relationship is "holding", the behavior prediction unit 54 predicts a behavior of "purchasing the product A 10 minutes later". Furthermore, in a case where the current behavior is "following" and the relationship is "stalking", the behavior prediction unit 54 predicts a behavior "attacking a target".

Furthermore, in FIG. 19, an example has been described in which the behavior prediction unit 54 performs behavior prediction using the current behavior and the latest expression. However, the embodiment is not limited to this. As described above, because the expression of the person is largely affected by an inner change of the person, the latest behavior is not limited to express the current expression. Therefore, as illustrated in FIG. 19, the behavior prediction unit 54 can perform behavior prediction using the current behavior specified according to the latest frame 3 and at least one relationship recognized up to the frame 3 or a change in the relationship from the frame 1 to the frame 3.

At this time, in a case where the current behavior is specified in a first frame that is an example of image data at a certain time and the relationship is specified in a second frame, the behavior prediction unit 54 determines whether or not the second frame is detected within a preset range of the number of frames or time from the point of time when the first frame is detected. Then, in a case where it is determined that the second frame is detected within the preset range, the behavior prediction unit 54 predicts a future behavior or a state of the person, based on the behavior of the person included in the first frame and the relationship included in the second frame.

For example, the behavior prediction unit 54 predicts the future behavior or the state of the person using the current behavior and the relationship detected at timings that are close to some extent. Note that the preset range can be arbitrarily set, and any one of the current behavior and the relationship may be specified first.

<Flow of Processing>

Figure 20:
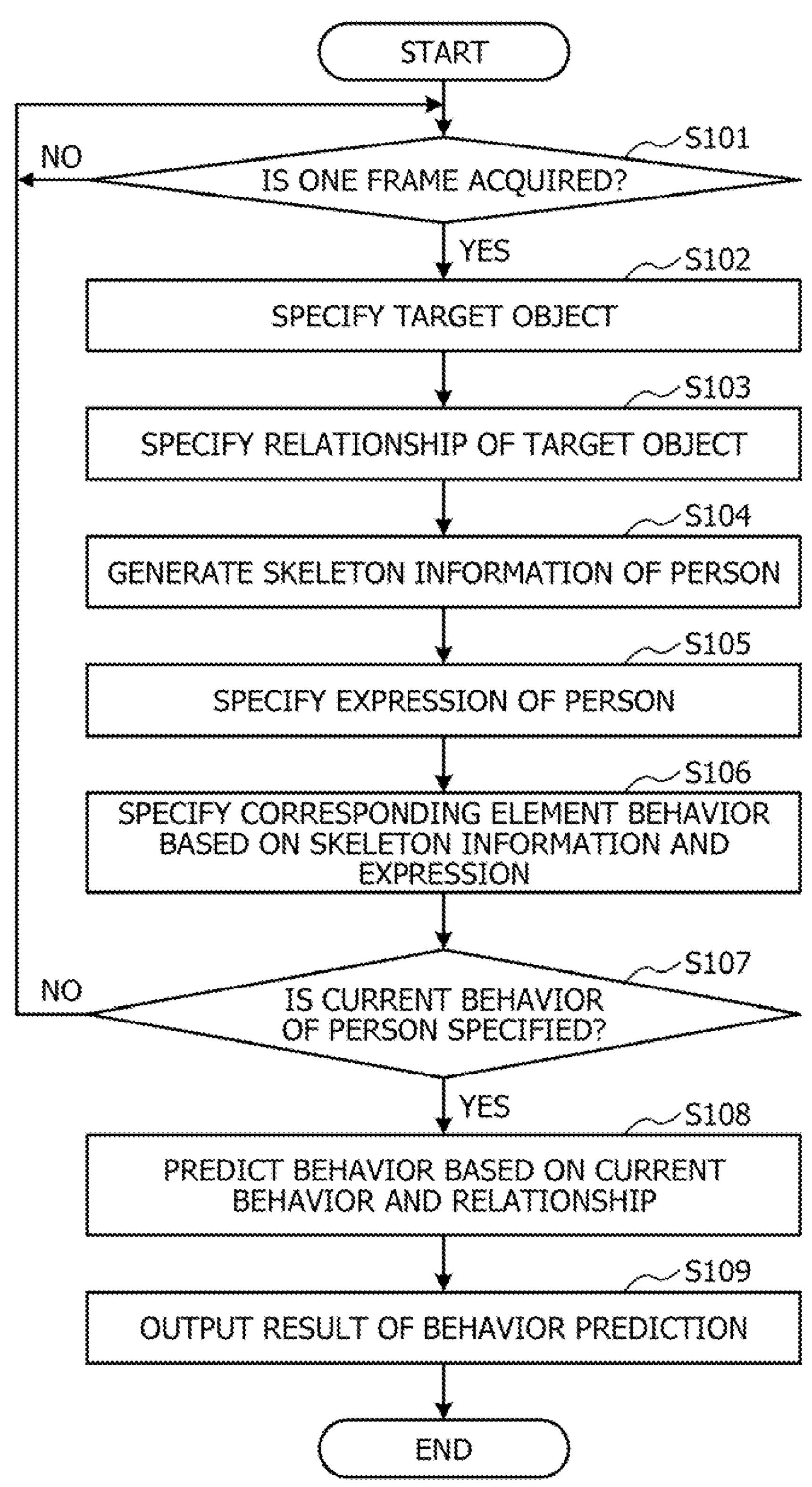
FIG. 20 is a flowchart illustrating a flow of behavior prediction processing.

FIG. 20 is a flowchart illustrating a flow of the behavior prediction processing. Note that, here, it is assumed that preprocessing have been completed. As illustrated in FIG. 20, when acquiring one frame (S101: Yes), the operation processing unit 50 specifies a target object imaged in the frame through image analysis or the like (S102). Subsequently, the operation processing unit 50 searches for the scene graph stored in the graph data DB 23 using the specified target object and specifies a relationship of the target object (S103).

Then, the operation processing unit 50 inputs the frame into the skeleton recognition model 24 and acquires skeleton information of a person indicating a movement of each part, for example (S104). Note that the operation processing unit 50 omits S104 in a case where no person is imaged in the frame in S103.

Furthermore, the operation processing unit 50 inputs the frame into the expression recognition model 25 and specifies an expression of the person from the output result and the expression recognition rule 26 (S105). Note that the operation processing unit 50 omits S105 in a case where no person is imaged in the frame in S103.

Thereafter, the operation processing unit 50 specifies the corresponding element behavior from the higher-order behavior specification rule 27, using the skeleton information and the expression of the person (S106). Here, in a case where the current behavior of the person is not specified (S107: No), the operation processing unit 50 repeats S101 and subsequent steps for a next frame.

On the other hand, in a case where the current behavior of the person is specified (S107: Yes), the operation processing unit 50 searches for the behavior prediction rule 28 using the current behavior and the specified relationship and predicts a future behavior of the person (S108). Thereafter, the operation processing unit 50 outputs a result of the behavior prediction (S109).

SPECIFIC EXAMPLES

Next, a specific example of a solution that contributes to realize a safe and secure society using the behavior prediction by the information processing apparatus 10 described above will be described. Here, a solution using a relationship between a person and an object and a solution using a relationship between persons will be described.

(Solution Using Relationship Between Person and Object)

Figure 21:
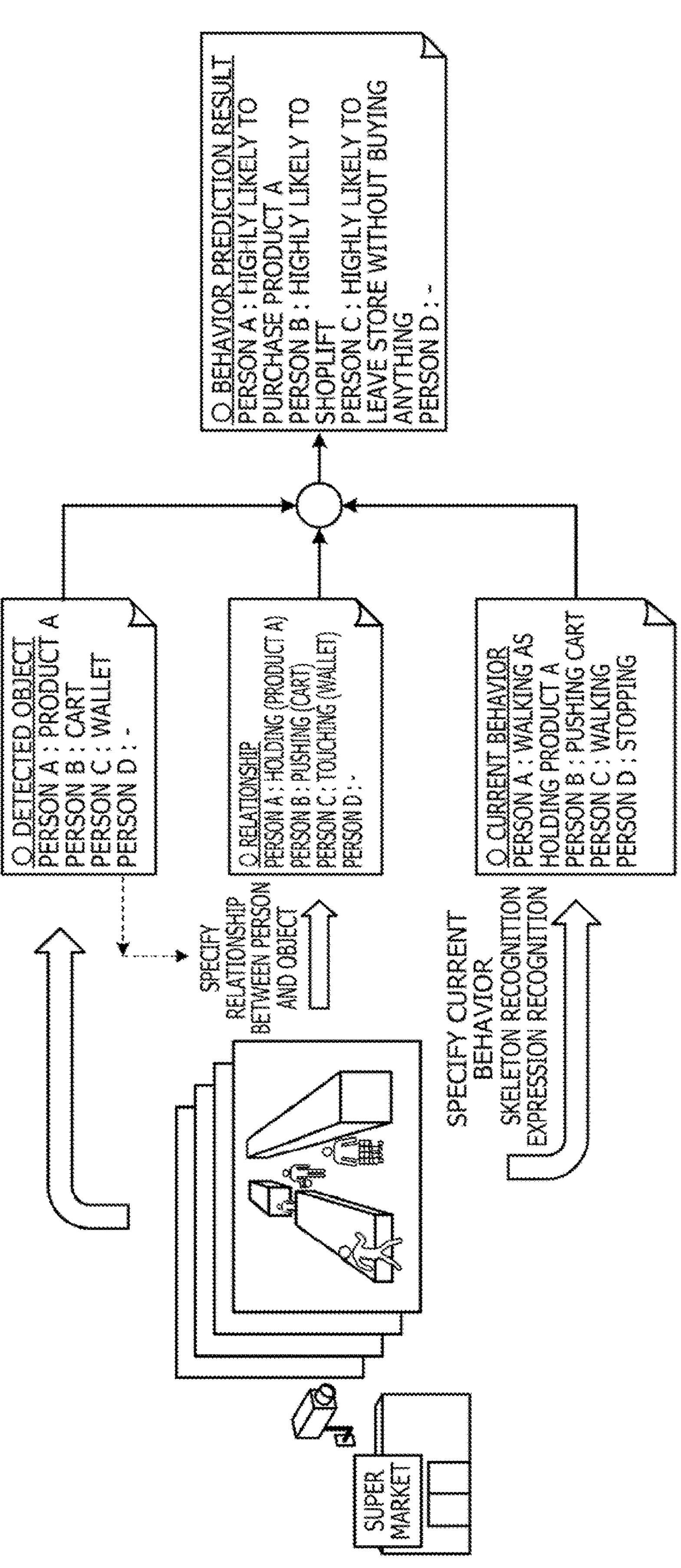
FIG. 21 is a diagram for explaining a solution example to which behavior prediction related to a person and an object is applied.

FIG. 21 is a diagram for explaining a solution example to which behavior prediction related to a person and an object is applied. In FIG. 21, an example of behavior prediction using video data captured by a surveillance camera in a supermarket or the like will be described. Note that processing to be described below is executed over a single frame or a plurality of frames in a single piece of the video data.

As illustrated in FIG. 21, the information processing apparatus 10 detects a person A and a product A, a person B and a cart, a person C and a wallet, and a person D from a frame in the video data. Then, using the detection result and the scene graph, the information processing apparatus 10 specifies a "relationship "holding" of the person A to the product A", a "relationship "pushing" of the person B to the cart", and a "relationship "touching" of the person C to the wallet". Here, because no object is detected for the person D, a relationship is not specified.

Furthermore, the information processing apparatus 10 performs the skeleton recognition using the skeleton recognition model 24 and the expression recognition using the expression recognition model 25 and specifies a current behavior "holding the product A" of the person A, a current behavior "pushing the cart" of the person B, a current behavior "walking" of the person C, and a current behavior "stopping" of the person D using these recognition results.

Then, the information processing apparatus 10 predicts a future behavior of the person A "highly likely to purchase the product A", a future behavior of the person B "highly likely to shoplift", and a future behavior of the person C "highly likely to leave the store without buying anything" through the behavior prediction using the current behaviors and the relationship. Here, because the relationship of the person D is not specified, the person D is excluded from the behavior prediction.

For example, the information processing apparatus 10 specifies a customer who moves in an area of a product shelf that is a predetermined area of the video data and a target product to be purchased by the customer, specifies a type of a behavior (for example, looking, holding, or the like) of the customer toward the product as a relationship, and predicts a behavior (for example, purchasing, shoplifting, or the like) regarding the purchase of the product by the customer.

In this way, the information processing apparatus 10 can utilize the behavior prediction described above for analysis of a purchasing behavior such as a behavior or a route before purchasing, purchasing marketing, or the like. Furthermore, the information processing apparatus 10 can detect a person, as the person B, who is highly likely to commit a crime such as shoplifting and can utilize the detection for prevention of crimes by strengthening monitoring of the person or the like.

(Solution Using Relationship Between Persons)

Figure 22:
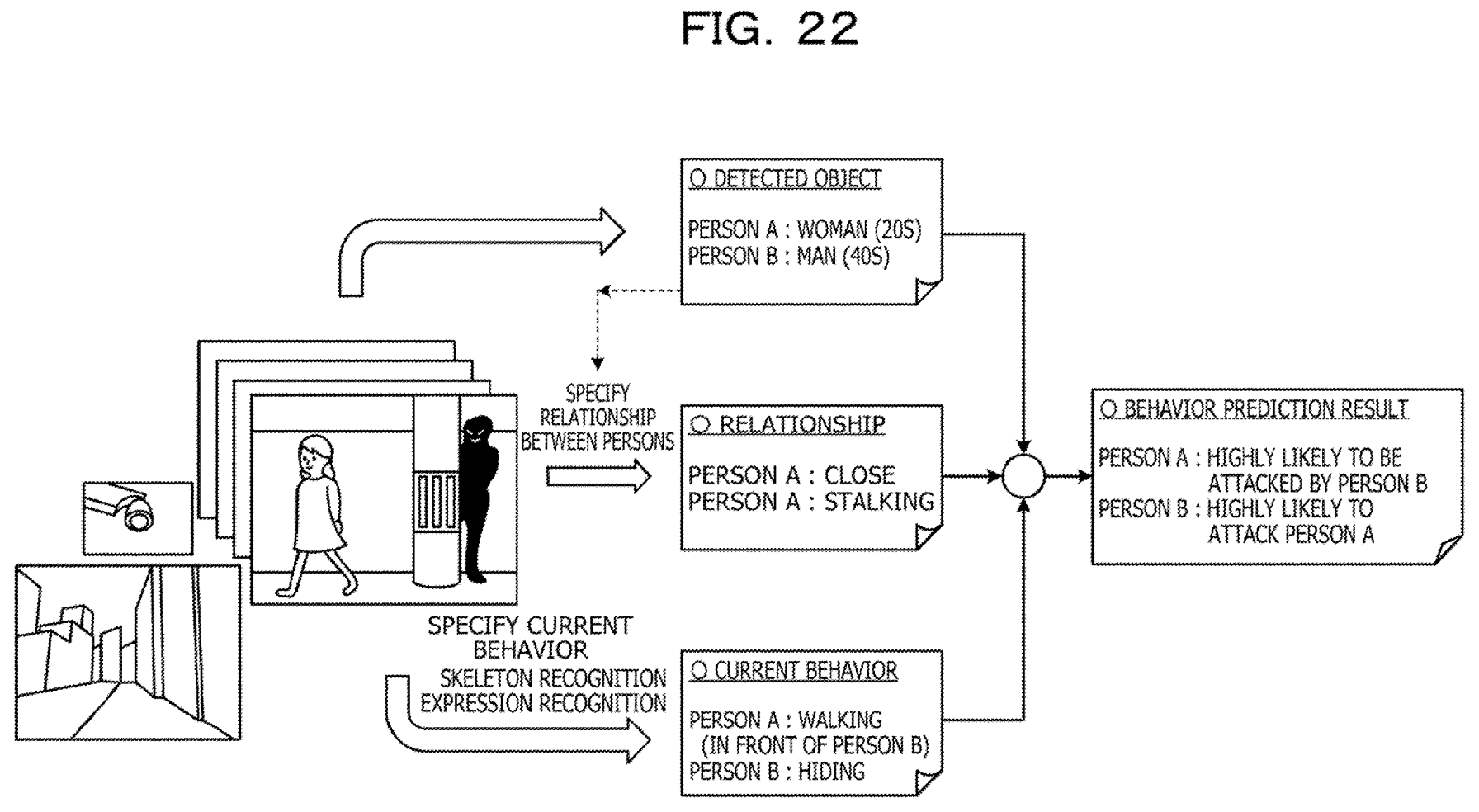

FIG. 22 is a diagram for explaining a solution example to which behavior prediction related to persons is applied. In FIG. 22, an example of behavior prediction using video data captured at night by a surveillance camera on a street or the like will be described. Note that processing to be described below is executed over a single frame or a plurality of frames in a single piece of the video data.

As illustrated in FIG. 22, the information processing apparatus 10 detects a person A (female: 20 s) and a person B (male: 40 s) from a frame in the video data. Then, the information processing apparatus 10 specifies a "relationship "close" of the person A to the person B" and a "relationship "stalking" of the person B to the person A", using the detection result and the scene graph.

Furthermore, the information processing apparatus 10 performs the skeleton recognition using the skeleton recognition model 24 and the expression recognition using the expression recognition model 25 and specifies a current behavior of the person A "walking in front of the person B" and a current behavior of the person B "hiding" using these recognition results.

Then, the information processing apparatus 10 predicts a future behavior of the person A "highly likely to be attacked by the person B" and a future behavior of the person B "highly likely to attack the person A" through the behavior prediction using the current behaviors and the relationships.

For example, the information processing apparatus 10 can assume the person A as a victim and the person B as a criminal and predict a criminal act against the person A to be committed by the person B according to the relationship "stalking" against the victim by the criminal. As a result, the information processing apparatus 10 can detect a place where a crime is highly likely to occur though the behavior prediction described above and take measures such as causing a police officer to go or the like. Furthermore, this can be used to examine countermeasures such as increasing the number of street lights at such points.

<Effects>

As described above, because the information processing apparatus 10 can predict a sign not occurrences of accidents and crimes, the information processing apparatus 10 can detect a situation that needs countermeasures in advance from video data. Furthermore, because the information processing apparatus 10 can perform behavior prediction from video data captured by a general camera such as a surveillance camera, the information processing apparatus 10 does not need a complicated system configuration and a new device and can be installed in an existing system. Furthermore, because the information processing apparatus 10 is installed in the existing system, a cost can be reduced as compared with new system construction. Furthermore, the information processing apparatus 10 can predict not only a simple behavior that is continuous from a past and current behaviors but also a complex behavior of a person that cannot be simply specified from the past and current behaviors. As a result, the information processing apparatus 10 can improve accuracy of predicting the future behavior of the person.

Furthermore, because the information processing apparatus 10 can realize behavior prediction using two-dimensional image data without using three-dimensional image data or the like, the information processing apparatus 10 can increase a speed of processing as compared with processing using a laser sensor or the like that has been recently used. Furthermore, due to high-speed processing, the information processing apparatus 10 can quickly detect a situation that needs countermeasures in advance.

Second Embodiment

Incidentally, while the embodiments have been described above, the embodiments may be carried out in a variety of different modes in addition to the embodiments described above.

<Numerical Values or the Like>

The numerical value examples, the number of cameras, the label names, the rule examples, the behavior examples, the state examples, the format and content of the behavior prediction rule, or the like used in the embodiments described above are merely examples and can be arbitrarily changed. Furthermore, the flow of the processing described in each flowchart may be appropriately changed within a range without inconsistency. Furthermore, the embodiments described above, the store has been described as an example. However, the embodiment is not limited to this, and can be applied to, for example, warehouses, factories, classrooms, train interiors, cabins of airplanes, or the like.

Example of Scene Graph

Note that, in the embodiments described above, the generation of the single scene graph including the plurality of relationships and the relationship specification using the scene graph have been described. However, the embodiment is not limited to this. For example, the information processing apparatus 10 can generate a single scene graph for a single relationship. For example, the information processing apparatus 10 can generate and use a single scene graph including N (N is a number equal to or more than one) relationships or N scene graphs respectively corresponding to the N relationships. When the N scene graphs are used, specifying the scene graph leads to specifying the relationship. In this case, the information processing apparatus 10 specifies a type of a person, a type of an object, the number of persons, or the like in the frame from the frame and specifies a single scene graph including these pieces of information in an object or an attribute so as to specify the relationship.

Furthermore, the information processing apparatus 10 can generate the scene graph for each frame. Here, with reference to FIG. 16, a relationship between a frame included in video data and a scene graph will be described. The graph generation unit 41 generates the scene graph for each of the plurality of frames. Then, the graph generation unit 41 generates a new scene graph in which the scene graphs generated for each frame are integrated into one. For example, the graph generation unit 41 specifies that a node (object) 1 included in a scene graph 1 generated from a frame 1 and a node 2 included in a scene graph 2 generated from a frame 2 are the same nodes (object) according to the type of the object or the like. At this time, the graph generation unit 41 couples the node 1 of the scene graph 1 and the node 2 of the scene graph 2 with a link and integrates the nodes 1 and 2 into a single node. As a result, the graph generation unit 41 generates a new scene graph in which the scene graphs 1 and 2 are combined. The graph generation unit 41 stores the new scene graph in the graph data DB 23. Note that the graph generation unit 41 may generate a single scene graph from a single frame.

<System>

Pieces of information including a processing procedure, a control procedure, a specific name, various types of data, and parameters described above or illustrated in the drawings may be optionally changed unless otherwise specified.

Furthermore, each component of each device illustrated in the drawings is functionally conceptual, and is not necessarily needed to be physically configured as illustrated in the drawings. For example, specific forms of distribution and integration of individual devices are not limited to those illustrated in the drawings. For example, all or a part thereof may be configured by being functionally or physically distributed or integrated in optional units according to various types of loads, usage situations, or the like.

Moreover, all or an optional part of individual processing functions performed in each device may be implemented by a central processing unit (CPU) and a program analyzed and executed by the CPU or may be implemented as hardware by wired logic.

<Hardware>

Figure 23:
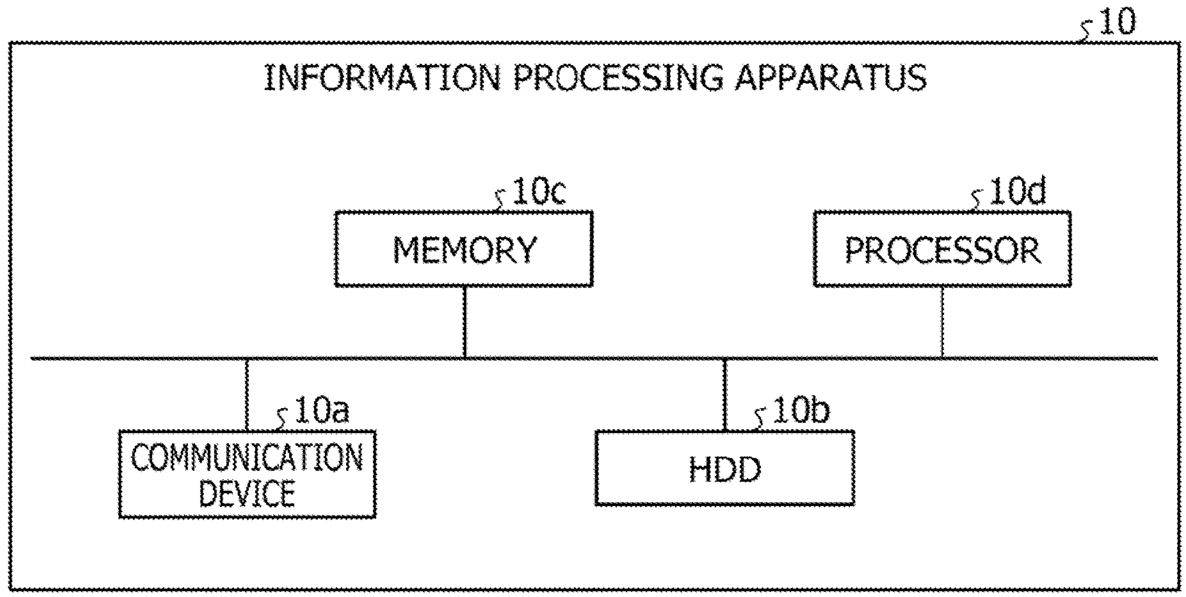
FIG. 23 is a diagram for explaining a hardware configuration example.

FIG. 23 is a diagram for explaining a hardware configuration example. As illustrated in FIG. 23, the information processing apparatus 10 includes a communication device 10*a*, a hard disk drive (HDD) 10*b*, a memory 10*c*, and a processor 10*d*. Furthermore, the individual units illustrated in FIG. 23 are mutually connected by a bus or the like.

The communication device 10*a* is a network interface card or the like, and communicates with another device. The HDD 10*b* stores a program that operates the functions illustrated in FIG. 4, and a DB.

The processor 10*d* reads a program that executes processing similar to the processing of each processing unit illustrated in FIG. 4 from the HDD 10*b* or the like, and develops the read program in the memory 10*c*, thereby operating a process that executes each function described with reference to FIG. 4 or the like. For example, the process implements a function similar to that of each processing unit included in the information processing apparatus 10. For example, the processor 10*d* reads a program having a function similar to the preprocessing unit 40, the operation processing unit 50, or the like from the HDD 10*b* or the like. Then, the processor 10*d* executes a process for executing processing similar to the preprocessing unit 40, the operation processing unit 50, or the like.

In this way, the information processing apparatus 10 operates as an information processing apparatus that executes a behavior prediction method by reading and executing a program. Furthermore, the information processing apparatus 10 may implement functions similar to those in the embodiments described above by reading the program described above from a recording medium with a medium reading device and executing the read program described above. Note that the program referred to in another embodiment is not limited to being executed by the information processing apparatus 10. For example, the embodiments described above may be similarly applied also to a case where another computer or server executes the program or a case where these cooperatively execute the program.

This program may be distributed via a network such as the Internet. Furthermore, the program may be recorded in a computer-readable recording medium such as a hard disk, a flexible disk (FD), a compact disc read only memory (CD-ROM), a magneto-optical disk (MO), or a digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program that causes at least one computer to execute a process, the process comprising:

acquiring video data that has target objects that include a person and an object;

specifying each relationship of each of the target objects in the acquired video data by using graph data that indicates a relationship of each of target object stored in a storage unit, the graph data including a node related to the target objects and an edge related to the relationship;

specifying a behavior of the person in the acquired video data by extracting, from the video data using at least one machine learning model, time-series feature vectors representing body movements and facial expressions of the person, identifying a sequence of elemental behaviors from the time-series feature vectors, and identifying the behavior by determining that the identified sequence of elemental behaviors corresponds to a pre-learned transition pattern, the pre-learned transition pattern being defined in a higher-order behavior specification rule that is generated from historical video data by machine learning that associates time-series transitions of feature vectors of body movements and facial expressions with a specific higher-order behavior; that a transition of the plurality of specified elemental behaviors matches a predetermined transition pattern defined in a higher order behavior specification rule; and predicting a future behavior of the person or a state of the person by comparing the specified behavior of the person and the specified relationship with a behavior prediction rule, the behavior prediction rule being a rule associated with a future behavior of a person for each combination of a behavior of the person and a relationship.

2. The non-transitory computer-readable storage medium according to claim 1, wherein the specified behavior of the person is included in a first frame of a plurality of frames of the video data, and the specified relationship is included in a second frame of the plurality of frames of the video data, wherein the predicting includes:

determining whether or not the second frame is detected within a certain time period from a point of time when the first frame is detected; and when the second frame is detected within the certain time period, predicting the future behavior of the person or the state of the person based on the behavior of the person included in the first frame and the relationship included in the second frame.

3. The non-transitory computer-readable storage medium according to claim 1, wherein the specifying each relationship of each of the target objects includes:

specifying the person and the object included in the video data; and specifying a relationship between the person and the object by searching for the graph data by using a type of the specified person and a type of the object.

4. The non-transitory computer-readable storage medium according to claim 3, wherein the person is a customer who moves in a certain area of the video data, the object is a target product to be purchased by the customer, and the predicting includes predicting a behavior regarding purchase of the product by the customer as the future behavior of the person or the state of the person.

5. The non-transitory computer-readable storage medium according to claim 1, wherein the specifying the plurality of elemental behaviors includes:

specifying the body movement of each part of the person by inputting the video data into a first machine learning model trained to recognize body movements;

and specifying the facial expression of the person by inputting the video data into a second machine learning model trained to recognize facial expressions, each of the plurality of elemental behaviors is specified based on the combination of the specified body movement and the specified facial expression.

6. The non-transitory computer-readable storage medium according to claim 1, wherein the specifying the relationship includes:

specifying a first person and a second person included in the video data; and specifying a relationship between the first person and the second person by searching for the graph data by using a type of the first person and a type of the second person.

7. The non-transitory computer-readable storage medium according to claim 6, wherein the first person is a potential criminal, the second person is a potential victim, the relationship is a type of a behavior of the first person toward the second person, the behavior of the potential criminal specified by identifying the predetermined transition pattern of the plurality of elemental behaviors comprises a preparatory behavior indicating a future criminal act, and the predicting includes predicting a criminal act against the second person to be committed by the first person as the future behavior of the person or the state of the person.

8. An information processing method for a computer to execute a process comprising:

acquiring video data that has target objects that include a person and an object;

specifying each relationship of each of the target objects in the acquired video data by using graph data that indicates a relationship of each of target object stored in a storage unit, the graph data including a node related to the target objects and an edge related to the relationship;

specifying a behavior of the person in the acquired video data by extracting, from the video data using at least one machine learning model, time-series feature vectors representing body movements and facial expressions of the person, identifying a sequence of elemental behaviors from the time-series feature vectors, and identifying the behavior by determining that the identified sequence of elemental behaviors corresponds to a pre-learned transition pattern, the pre-learned transition pattern being defined in a higher-order behavior specification rule that is generated from historical video data by machine learning that associates time-series transitions of feature vectors of body movements and facial expressions with a specific higher-order behavior; and predicting a future behavior of the person or a state of the person by comparing the specified behavior of the person and the specified relationship with a behavior prediction rule, the behavior prediction rule being a rule associated with a future behavior of a person for each combination of a behavior of the person and a relationship.

9. The information processing method according to claim 8, wherein the specified behavior of the person is included in a first frame of a plurality of frames of the video data, and the specified relationship is included in a second frame of the plurality of frames of the video data, wherein the predicting includes:

determining whether or not the second frame is detected within a certain time period from a point of time when the first frame is detected; and when the second frame is detected within the certain time period, predicting the future behavior of the person or the state of the person based on the behavior of the person included in the first frame and the relationship included in the second frame.

10. The information processing method according to claim 8, wherein the specifying each relationship of each of the target objects includes:

specifying the person and the object included in the video data; and specifying a relationship between the person and the object by searching for the graph data by using a type of the specified person and a type of the object.

11. The information processing method according to claim 8, wherein the specifying the plurality of elemental behaviors includes:

specifying the body movement of each part of the person by inputting the video data into a first machine learning model trained to recognize body movements; and specifying the facial expression of the person by inputting the video data into a second machine learning model trained to recognize facial expressions, each of the plurality of elemental behaviors is specified based on the combination of the specified body movement and the specified facial expression.

12. An information processing apparatus comprising:

one or more memories; and one or more processors coupled to the one or more memories and the one or more processors configured to:

acquire video data that has target objects that include a person and an object, specify each relationship of each of the target objects in the acquired video data by using graph data that indicates a relationship of each of target object stored in a storage unit, the graph data including a node related to the target objects and an edge related to the relationship, specify a behavior of the person in the acquired video data by extracting, from the video data using at least one machine learning model, time-series feature vectors representing body movements and facial expressions of the person, identifying a sequence of elemental behaviors from the time-series feature vectors, and identifying the behavior by determining that the identified sequence of elemental behaviors corresponds to a pre-learned transition pattern, the pre-learned transition pattern being defined in a higher-order behavior specification rule that is generated from historical video data by machine learning that associates time-series transitions of feature vectors of body movements and facial expressions with a specific higher-order behavior, and predict a future behavior of the person or a state of the person by comparing the specified behavior of the person and the specified relationship with a behavior prediction rule, the behavior prediction rule being a rule associated with a future behavior of a person for each combination of a behavior of the person and a relationship.

13. The information processing apparatus according to claim 12, wherein the specified behavior of the person is included in a first frame of a plurality of frames of the video data, and the specified relationship is included in a second frame of the plurality of frames of the video data, wherein the one or more processors are further configured to:

determine whether or not the second frame is detected within a certain time period from a point of time when the first frame is detected, and when the second frame is detected within the certain time period, predict the future behavior of the person or the state of the person based on the behavior of the person included in the first frame and the relationship included in the second frame.

14. The information processing apparatus according to claim 12, wherein the one or more processors are further configured to:

specify the person and the object included in the video data, and specify a relationship between the person and the object by searching for the graph data by using a type of the specified person and a type of the object.

15. The information processing apparatus according to claim 12, wherein the one or more processors are further configured to:

specify the body movement of each part of the person by inputting the video data into the first machine learning model trained to recognize body movements, and specify the facial expression of the person by inputting the video data into a second machine learning model trained to recognize facial expressions, each of the plurality of elemental behaviors is specified based on the combination of the specified body movement and the specified facial expression.

* * * * *